(12) United States Patent
Appling, Jr. et al.

(10) Patent No.: US 12,043,524 B2
(45) Date of Patent: *Jul. 23, 2024

(54) REMOTELY OPERATED CRANE CONTROL SYSTEM

(71) Applicant: TNT Crane & Rigging, Inc., Houston, TX (US)

(72) Inventors: Michael Appling, Jr., Houston, TX (US); Edgar Martinez, Houston, TX (US)

(73) Assignee: TNT Crane & Rigging, Inc., Houston, TX (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/706,952

(22) Filed: Mar. 29, 2022

(65) Prior Publication Data

US 2023/0278834 A1 Sep. 7, 2023

Related U.S. Application Data

(60) Provisional application No. 63/316,463, filed on Mar. 4, 2022.

(51) Int. Cl.
*B66C 13/40* (2006.01)
*H04L 67/12* (2022.01)

(52) U.S. Cl.
CPC ............. *B66C 13/40* (2013.01); *H04L 67/12* (2013.01)

(58) Field of Classification Search
CPC ................................ B66C 13/40; H04L 67/12
USPC ........................................................ 701/50
See application file for complete search history.

(56) References Cited

U.S. PATENT DOCUMENTS

| 6,112,839 | A | * | 9/2000 | Ostler | ................. | E02F 9/2025 |
| | | | | | | 180/53.4 |
| 8,562,387 | B1 | * | 10/2013 | Henthorne | ............ | A63H 30/04 |
| | | | | | | 180/218 |
| 9,955,313 | B1 | * | 4/2018 | Bacarella | ......... | H04W 52/0258 |
| 10,661,989 | B2 | | 5/2020 | Muranaka | | |
| 10,906,784 | B2 | | 2/2021 | Schilling et al. | | |

(Continued)

FOREIGN PATENT DOCUMENTS

CN 110869306 A 3/2020

OTHER PUBLICATIONS

International Search Report and Written Opinion for International Application No. PCT/US2022/045564, report mail date Feb. 20, 2023; pp. 1-13.

(Continued)

*Primary Examiner* — Krishnan Ramesh
(74) *Attorney, Agent, or Firm* — Bracewell LLP

(57) ABSTRACT

Provided is a remote control crane system including a remote crane control center (RCCC) having a remote crane controller (RCC), remote crane controls, and a remote crane control activation system that can be activated/deactivated to enable/disable control of a remote controlled crane system by way of the remote crane controls. The RCC operable to receive, by way of the remote crane controls, a remote control command to cause a given operation by the remote controlled crane system, and, in response to determining that the remote controlled crane activation system is activated, send, to the remote controlled crane system, crane remote control data including a command to cause the given operation by the remote controlled crane system.

16 Claims, 6 Drawing Sheets

(56) References Cited

U.S. PATENT DOCUMENTS

| | | | |
|---|---|---|---|
| 2001/0018632 A1* | 8/2001 | Thomas | F01P 7/167 |
| | | | 701/115 |
| 2010/0139792 A1* | 6/2010 | Rau | B66C 13/063 |
| | | | 340/12.51 |
| 2012/0316686 A1 | 12/2012 | Dueckman | |
| 2016/0194014 A1 | 7/2016 | Rajendran | |
| 2016/0207743 A1* | 7/2016 | Vikman | B66C 15/00 |
| 2017/0084169 A1* | 3/2017 | Sinaguinan | G08C 17/02 |
| 2017/0192428 A1 | 7/2017 | Vogt et al. | |
| 2017/0308080 A1 | 10/2017 | Brooks et al. | |
| 2019/0163176 A1 | 5/2019 | Wang et al. | |
| 2019/0284027 A1 | 9/2019 | Albrecht | |
| 2019/0322498 A1* | 10/2019 | Andersson | B66C 13/18 |
| 2020/0062218 A1* | 2/2020 | Lee | G07C 9/00309 |
| 2020/0062555 A1* | 2/2020 | Appling, Jr. | B66C 13/16 |
| 2020/0254875 A1* | 8/2020 | Strandberg | G06F 3/0484 |
| 2021/0114847 A1 | 4/2021 | Schilling et al. | |
| 2022/0048742 A1* | 2/2022 | Kärki | H01H 25/04 |
| 2022/0356052 A1* | 11/2022 | Kim | G05D 1/0061 |

OTHER PUBLICATIONS

ABB; "Remote crane operations" available as of Apr. 10, 2018 at: http://new.abb.com/ports/solutions-for-marine-terminals/our-offerings/container-terminal-automation/remote-crane-operation; pp. 1-5.

Konecranes.com; "Remote Operating Station" available as of Apr. 10, 2018 at: http://www.konecranes.com/resource/remote-operating-station-0; pp. 1-6.

YouTube; Tony Seba on the driverless car disruption—2016 DSA State of Downtown; available as of Aug. 15, 2019 at: https://www.youtube.com/watch?v=xg03UUYKG1s&sns=em.

* cited by examiner

REMOTELY OPERATED CRANE CONTROL SYSTEM

RELATED APPLICATIONS

This applicant claims priority to U.S. Provisional Application No. 63/316,463, filed on Mar. 4, 2022 and titled "REMOTELY OPERATED CRANE CONTROL SYSTEM" which is hereby incorporated by reference in its entirety.

FIELD

Embodiments relate generally to crane systems, and more particularly to remotely operated crane systems.

BACKGROUND

Cranes are machines designed to lift, lower and move loads. Cranes are commonly used for loading and unloading freight, moving heavy materials, and assembling heavy equipment. Cranes are typically provided in the form of fixed or mobile cranes. Fixed cranes are typically erected in-place at a jobsite and are stationary over the course of the job. A tower crane, often erected at a building site to erect a relatively tall structure, is an example of a fixed crane. Mobile cranes typically include wheels, tracks or crawlers that allow the crane to move between locations. Some mobile cranes are designed to be driven to and from a jobsite under their own power. For example, a truck-mounted crane often includes wheels and driving controls that enable the truck-mounted crane to be driven on roadways, to and from jobsites, and to be moved into working positions at jobsites.

In many instances, cranes are provided at a jobsite to provide hoisting operations at the jobsite. For example, a mobile crane may be driven to a jobsite for use in loading and unloading freight at the jobsite, moving heavy materials at the jobsite and assembling heavy equipment at the jobsite. In the case of oil and gas operations, the jobsite can include a well-site. Cranes are often used at a well-site to support well components during various well operations or to move equipment and materials about the well-site. For example, a mobile crane may be used at a well-site to lift and hold an injector head that runs and retrieves coil tubing in a well.

SUMMARY

Applicants have recognized that, in many instances, crane operations are not continuous and thus a crane operator may only be called upon to operate a crane for a short period of time over the course of a job. For example, in the context of a crane being provided at a well-site to assist with oil and gas well operations, the crane may be operated for about two hours over the course of a twelve-hour shift. Thus, a crane operator may only have a "seat-time" (the amount of time actually engaged in operating the crane) of about two hours, and ten hours of "downtime" (the amount of time not engaged in operating the crane). In addition to being present for an entire shift, an operator usually has to travel to and from the jobsite, daily. In many instances, jobs are located in rural areas that can require extended periods of driving (e.g., upwards of six hours of driving per day to travel to and from the jobsite). Thus, a crane operator may have upwards of 16 hours of downtime and travel time, for about two hours of seat-time. The total amount of downtime and travel time can increase significantly for longer jobs. For example, a typical coil-tubing job at a well-site can take about two weeks to complete. Continuing with the above example, this can result in upwards of 224 hours of downtime and travel time and about 28 hours of seat-time for the job. Thus in the context of a job at a remote jobsite, such as a well-site in a rural oilfield, after a crane is setup at the jobsite, the crane operator may be present for complete shifts, despite the operator only performing lift operations for relatively short periods of time during the shifts, and the crane operator may have to make lengthy drives to and from the jobsite each day to be on-call for performing short lift operations over the course of the shift. These types of jobs can have a disproportionally small amount of seat-time, and thus are not an efficient use of crane operator resources.

The safety of persons at jobsites and the safety of persons traveling to and from jobsites are important. Unfortunately, extended travel can create safety risks. For example, extended travel can create inherent safety risks associated with the travel itself, such as the risk of a vehicle accident, as well as create jobsite safety risks due to driving fatigue, such as the risk of impaired judgment at the jobsite. The risk of impaired judgment can be especially important in the context of crane operators because crane operations typically involve multiple workers that are at risk of being injured by movement of the crane and loads moved by the crane.

Recognizing these and other shortcomings of existing crane technologies and operations, provided are novel systems and methods for remotely operated crane systems. In some embodiments, a remote crane system includes a crane designed to be located at a jobsite and to be operated remotely by a remote crane operator located at an off-site/remote crane control center (RCCC). Communication between the crane and the RCCC may be facilitated by a remote communication network, such as cellular or satellite communication networks.

In some embodiments, a remote crane system includes local controls that facilitate local control of the crane by a "local" operator physically present at a jobsite and is also capable of operating under remote control by a "remote" operator physically present at RCCC, remote from the jobsite. The local controls may, for example, enable an operator to control the crane locally, from the jobsite. This may be important during setup and take down of the crane, when a local operator is available at the jobsite, or in the case of an emergency, such as a loss of remote communications with the off-site crane operation center. The remote controls may, for example, enable a remote operator to monitor and operate the crane remotely. This can be important for executing day-to-day operations of the crane on-demand, without requiring the operator to travel to the jobsite or to be present at the jobsite during downtime.

In some embodiments, a remotely operated crane includes additional elements to enhance safety of the crane, especially while being operated remotely. In some embodiments, a remotely operated crane system includes cameras for capturing video images of the crane and areas around the crane. Such video images may act as the eyes of a remote crane operator by providing the operator with visual information needed to assess conditions at the jobsite and assess operation of the crane. In some embodiments, a remotely operated crane includes audio devices for relaying audio to and from a crane operator. Such audio may act as the ears of a remote crane operator by providing the operator with audible information needed to assess conditions at the jobsite and assess operation of the crane. In some embodiments, a remotely operated crane system includes proximity sensors (e.g., lidar sensors) that can detect the presence of prohibited persons or objects in regions of interest (ROIs) located about the crane, such as a "fall-zone" of the crane. In response to detecting the presence of prohibited persons or objects in certain ROIs located about the crane, operation of the crane may be inhibited and a corresponding alert may be presented to the crane operator. This may allow the operator to assess the situation and determine how best to proceed. In some embodiments, an off-site crane operation center includes a remote operations dashboard for presenting crane operational information to an operator. For example, the dashboard may include real-time display of information corresponding to operational data received from the remotely operated crane, such as operational parameters of the crane and video images of the jobsite. The combination of the video information, the audio information, the proximity information, and the information provided via the dashboard, may enable an operator to fully monitor and control operations of the crane in real-time, from an off-site crane operation center, as if physically present at the jobsite.

In some embodiments, a remote crane system includes an activation system that provides for selective enablement and disablement of remote control of the crane. For example, one or both of the remote controlled crane system and the RCCC may have an activation system that can be enabled to provide for the transmission, receipt and execution of remote commands generated using remote crane controls of the RCCC. Such a system may enhance safety by ensuring that remote control is accomplished only when desired.

In some embodiments, a local remote crane control activation system (or "local activation system") located at the crane system is operable to allow persons at the jobsite to selectively enable or disable remote control of the crane. For example, the local activation system may include a remote activation switch that can be toggled between an active ("on") position and inactive ("off") position to enable or disable, respectively, remote control of the crane by way of remote control commands transmitted to the crane from the RCCC by way of the remote communication network. In some embodiments, a channel tasked with receiving the remote control commands from the RCCC is activated or deactivated to enable or disable receipt of the remote control commands. For example, a control board of the network interface tasked with receiving the remote control commands by way of the network may be turned on or off to allow or prevent, respectively, receipt of the remote control commands by the crane's local controller. In such an embodiment, the crane's local controller would not receive or execute remote commands while the remote activation switch is set to an inactive ("off") position.

In some embodiments, a remote crane control activation system (or "remote activation system") located at the RCCC is operable to allow persons at the RCCC to selectively enable or disable remote control of the crane from the RCCC. For example, the remote activation system may include a remote activation switch that can be toggled between an active ("on") position and inactive ("off") position to enable or disable, respectively, transmission of remote commands to the crane from the RCCC by way of the remote communication network. In some embodiments, the RCCC only sends remote control commands to the crane while the RCCC's remote activation system is enabled. For example, in response to a controller of the RCCC receiving a command by way of the remote crane controls of the RCCC, the controller may determine a status of the RCCC's remote activation system. This may, for example, be accomplished by the controller polling a remote activation status bit that is set to correspond to the current state of the RCCC's remote activation system. In response to determining that the RCCC's remote activation system is active, the controller may send, to the crane by way of the network, crane remote control data corresponding to the command. In response to determining that the RCCC's remote activation system is inactive, the controller may not send data corresponding to the command to the crane. In such an embodiment, the RCCC's controller would only send data commanding operations of the crane while the RCCC's remote activation switch is set to an active position.

Embodiments may enable "on-demand seat-time" allowing an operator to monitor or operate a crane at a remote jobsite on an as-needed basis, without having to travel to, or otherwise be physically present at, the jobsite. This can help to eliminate the excessive amounts of travel time and downtime for a crane operator. Moreover, if there are multiple jobs for which seat-time is relatively short in comparison to travel and downtime, a remotely operated crane can be provided at the each of the respective jobsites, and all of the remotely operated cranes can be monitored and controlled from a single off-site crane operation center. In such an embodiment, one or more remote crane operators may monitor or control each of the remotely operated cranes on-demand, from an off-site crane operation center. This can provide an economically beneficial allocation of operator resources, while reducing travel time, reducing downtime, and improving safety.

Provided in some embodiments is a remote crane system that includes the following: a communication network; a remote controlled crane system adapted to be located at a jobsite, the remote controlled crane system including: a lifting system adapted to lift a load; local crane controls adapted to be manipulated by a local crane operator to control operation of the remote controlled crane system; and a crane controller adapted to: receive, from the local crane controls, local control commands and operate the remote controlled crane system based on the local control commands; and receive, from a RCCC by way of the communication network, remote control commands, and operate the remote controlled crane system based on the remote control commands; and the RCCC including: a remote crane controller (RCC); remote crane controls adapted to be manipulated by a remote crane operator to control operation of the remote controlled crane system; and a remote crane control activation system adapted to be (a) activated to enable control of the remote controlled crane system by way of the remote crane controls, and (b) deactivated to disable control of the remote controlled crane system by way of the remote crane controls, the RCC adapted to: receive, by way of the remote crane controls, a remote control command adapted to cause a given operation by the remote controlled crane system; determine, in response to receiving the remote control command, whether the remote controlled crane activation system is activated; and in response to determining that the remote controlled crane activation system is activated: send, to the remote controlled crane system by way of the communication network, crane remote control data including a command adapted to cause the given operation by the remote controlled crane system.

In some embodiments, the RCCC is further adapted to, in response to determining that the remote controlled crane activation system is not activated, inhibit sending of the command to the remote controlled crane system. In certain embodiments, the remote crane control activation system includes a remote state control adapted to be (a) set to a first state adapted to activate the remote crane control activation system and (b) set to a second state adapted to deactivate the remote crane control activation system. In some embodiments, the remote state control includes a switch. In certain embodiments, the remote crane control activation system is activated in response to employment of an access control device. In some embodiments, the access control device includes a radio frequency identification (RFID) token, where the remote crane control activation system includes a RFID reader, and where the remote crane control activation system is activated in response to the RFID reader reading information from the RFID token. In certain embodiments, the remote crane control activation system includes a redundant access control system comprising an access control device, and wherein the remote crane control activation system is activated in response to (a) employment of the access control device to enable activation of the remote crane control activation system by way of a remote state control; and (b) activation of the remote state control. In some embodiments, the RCC is further adapted to: set a remote control status bit to a first state in response to the remote crane control activation system being activated; and set the remote control status bit to a second state in response to the remote crane control activation system being deactivated, where determining whether the remote controlled crane activation system is activated includes polling the remote control status bit to determine whether the remote control status bit is set to the first state, and where it is determined that the remote controlled crane activation system is activated in response to determining that the remote control status bit is set to the first state. In certain embodiments, the remote controlled crane system includes a local remote crane control activation system adapted to be (a) activated to enable remote control of the remote controlled crane system, and (b) deactivated to disable remote control of the remote controlled crane system, such that (i) when a remote control command is transmitted to the remote controlled crane system while the local remote crane control activation system is activated, the remote controlled crane system is adapted to operate based on the remote control command, and (ii) when a remote control command is transmitted to the remote controlled crane system while the local remote crane control activation system is deactivated, the remote controlled crane system is adapted to not operate based on the remote control command.

Provided in some embodiments is a remote crane system including the following: a RCCC including: a RCC; remote crane controls adapted to be manipulated by a remote crane operator to control operation of a remote controlled crane system; and a remote crane control activation system adapted to be (a) activated to enable control of the remote controlled crane system by way of the remote crane controls, and (b) deactivated to disable control of the remote controlled crane system by way of the remote crane controls, the remote controlled crane system adapted to be located at a jobsite, the remote controlled crane system including: a lifting system adapted to lift a load; local crane controls adapted to be manipulated by a local crane operator to control operation of the remote controlled crane system; and a crane controller adapted to: receive, from the local crane controls, local control commands and operate the remote controlled crane system based on the local control commands; and receive, from the RCCC by way of a communication network, remote control commands, and operate the remote controlled crane system based on the remote control commands; and the RCC adapted to: receive, by way of the remote crane controls, a remote control command adapted to cause a given operation by the remote controlled crane system; determine, in response to receiving the remote control command, whether the remote controlled crane activation system is activated; and in response to determining that the remote controlled crane activation system is activated: send, to the remote controlled crane system by way of the communication network, crane remote control data including a command adapted to cause the given operation by the remote controlled crane system.

In some embodiments, the RCC is further adapted to, in response to determining that the remote controlled crane activation system is not activated, inhibit sending of the command to the remote controlled crane system. In certain embodiments, the remote crane control activation system includes a remote state control adapted to be (a) set to a first state adapted to activate the remote crane control activation system and (b) set to a second state adapted to deactivate the remote crane control activation system. In some embodiments, the remote state control includes a switch. In certain embodiments, the remote crane control activation system is activated in response to employment of an access control device. In some embodiments, the access control device includes a RFID token, where the remote crane control activation system includes a RFID reader, and where the remote crane control activation system is activated in response to the RFID reader reading information from the RFID token. In certain embodiments, the remote crane control activation system includes a redundant access control system comprising an access control device, and wherein the remote crane control activation system is activated in response to (a) employment of the access control device to enable activation of the remote crane control activation system by way of a remote state control; and (b) activation of the remote state control. In some embodiments, the RCCC is further adapted to: set a remote control status bit to a first state in response to the remote crane control activation system being activated; and set the remote control status bit to a second state in response to the remote crane control activation system being deactivated, where determining whether the remote controlled crane activation system is selectively activated includes polling the remote control status bit to determine whether the remote control status bit is set to the first state, and where it is determined that the remote controlled crane activation system is activated in response to determining that the remote control status bit is set to the first state. In certain embodiments, the remote controlled crane system includes a local remote crane control activation system adapted to be (a) activated to enable remote control of the remote controlled crane system, and (b) deactivated to disable remote control of the remote controlled crane system, such that (i) when a remote control command is transmitted to the remote controlled crane system while the local remote crane control activation system is activated, the remote controlled crane system is adapted to operate based on the remote control command, and (ii) when a remote control command is transmitted to the remote controlled crane system while the local remote crane control activation system is deactivated, the remote controlled crane system is adapted to not operate based on the remote control command.

Provided in some embodiments is a method of operating a remote control crane system. The method including the following: receiving, by a RCC by way of remote crane controls of a RCCC, a remote control command adapted to cause a given operation by a remote controlled crane system, the RCCC including: the RCC; remote crane controls adapted to be manipulated by a remote crane operator to control operation of a remote controlled crane system; and a remote crane control activation system adapted to be (a) activated to enable control of the remote controlled crane system by way of the remote crane controls, and (b) deactivated to disable control of the remote controlled crane system by way of the remote crane controls, the remote controlled crane system adapted to be located at a jobsite, the remote controlled crane system including: a lifting system adapted to lift a load; local crane controls adapted to be manipulated by a local crane operator to control operation of the remote controlled crane system; and a crane controller adapted to: receive, from the local crane controls, local control commands and operate the remote controlled crane system based on the local control commands; and receive, from the RCCC by way of a communication network, remote control commands, and operate the remote controlled crane system based on the remote control commands; determining, by the RCC in response to receiving the remote control command, that the remote controlled crane activation system is activated; and sending, by the RCC to the remote controlled crane system by way of the communication network in response to determining that the remote controlled crane activation system is activated, crane remote control data including a command adapted to cause the given operation by the remote controlled crane system.

In some embodiments, the remote crane control activation system includes a remote state control adapted to be (a) set to a first state to activate the remote crane control activation system and (b) set to a second state to deactivate the remote crane control activation system, and determining that the remote controlled crane activation system is activated includes determining that the remote state control is set to the first state to activate the remote crane control activation system. In certain embodiments, the remote state control includes a switch. In some embodiments, the method further includes, in response to determining that the remote controlled crane activation system is not activated, the RCC inhibiting sending of the command to the remote controlled crane system. In certain embodiments, the method further includes, activating the remote crane control activation system in response to employment of an access control device. In some embodiments, the access control device includes a RFID token and the remote crane control activation system includes a RFID reader, and activating the remote crane control activation system includes activating the remote crane control activation system in response to the RFID reader reading information from the RFID token. In certain embodiments, the remote crane control activation system includes a redundant access control system including an access control device, and the method further includes activation of the remote crane control activation system in response to (a) employment of the access control device to enable activation of the remote crane control activation system by way of a remote state control; and (b) activation of the remote state control. In some embodiments, the method further includes the RCCC setting a remote control status bit to a first state in response to the remote crane control activation system being activated and determining that the remote controlled crane activation system is activated responsive to polling the remote control status bit to determine that the remote control status bit is set to the first state.

Figure 1:
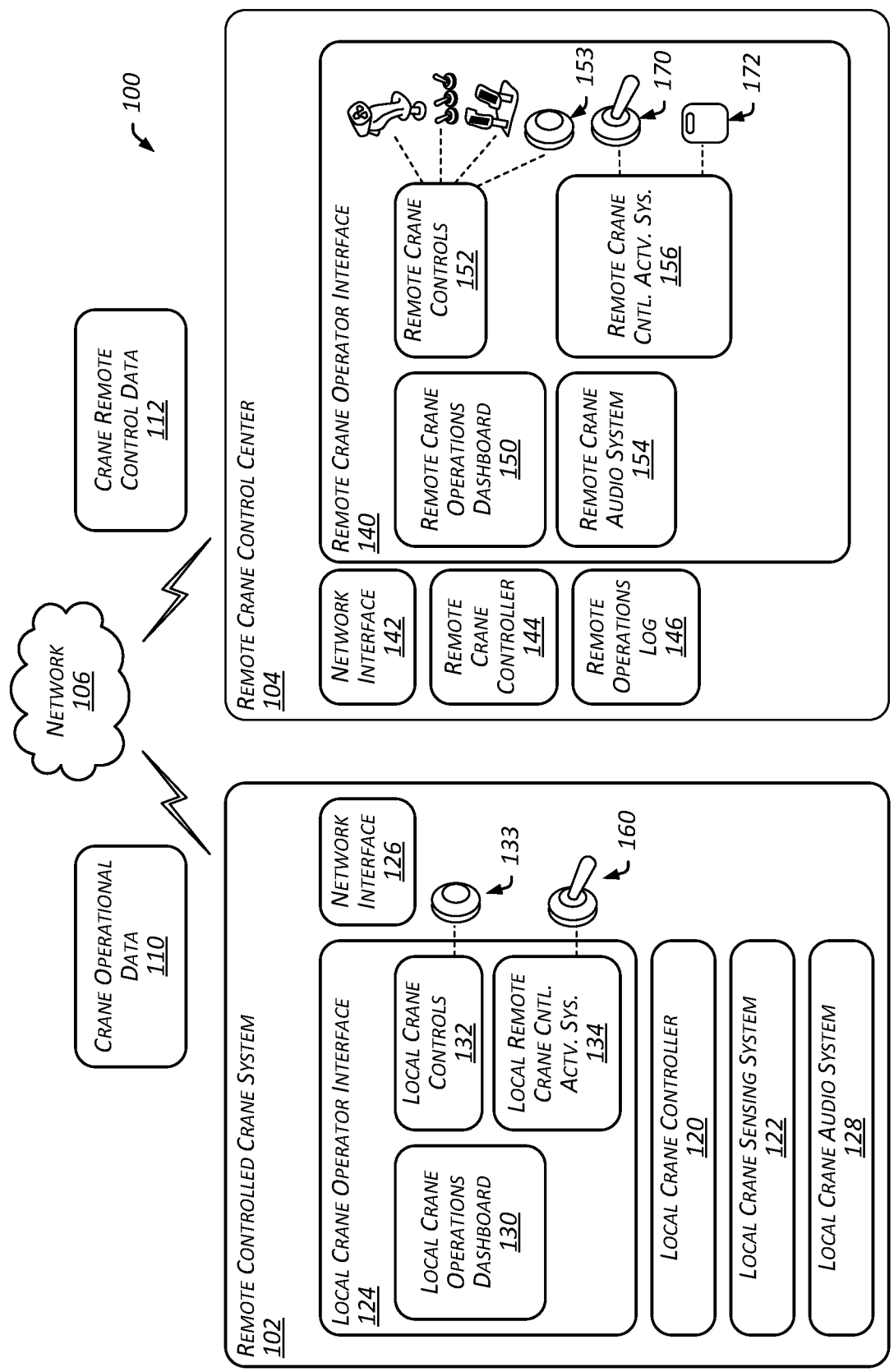
FIG. 1 is a block diagram that illustrates a remotely operated crane system in accordance with one or more embodiments.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure is thorough and complete, and fully conveys the scope of the disclosure to those skilled in the art.

DETAILED DESCRIPTION

Described are embodiments of novel systems and methods for remotely operated crane systems. In some embodiments, a remote crane system includes a crane designed to be located at a jobsite and to be operated remotely by a remote crane operator located at an off-site/remote crane control center (RCCC). Communication between the crane and the RCCC may be facilitated by a remote communication network, such as cellular or satellite communication networks.

In some embodiments, a remote crane system includes local controls that facilitate local control of the crane by a "local" operator physically present at a jobsite and is also capable of operating under remote control by a "remote" operator physically present at the RCCC, remote from the jobsite. The local controls may, for example, enable an operator to control the crane locally, from the jobsite. This may be important during setup and take down of the crane, when a local operator is available at the jobsite, or in the case of an emergency, such as a loss of remote communications with the off-site crane operation center. The remote controls may, for example, enable a remote operator to monitor and operate the crane remotely. This can be important for executing day-to-day operations of the crane on-demand, without requiring the operator to travel to the jobsite or to be present at the jobsite during downtime.

In some embodiments, a remotely operated crane includes additional elements to enhance safety of the crane, especially while being operated remotely. In some embodiments, a remotely operated crane system includes cameras for capturing video images of the crane and areas around the crane. Such video images may act as the eyes of a remote crane operator by providing the operator with visual information needed to assess conditions at the jobsite and assess operation of the crane. In some embodiments, a remotely operated crane includes audio devices for relaying audio to and from a crane operator. Such audio may act as the ears of a remote crane operator by providing the operator with audible information needed to assess conditions at the jobsite and assess operation of the crane. In some embodiments, a remotely operated crane system includes proximity sensors (e.g., lidar sensors) that can detect the presence of prohibited persons or objects in regions of interest (ROIs) located about the crane, such as a "fall-zone" of the crane.

In response to detecting the presence of prohibited persons or objects in certain ROIs located about the crane, operation of the crane may be inhibited and a corresponding alert may be presented to the crane operator. This may allow the operator to assess the situation and determine how best to proceed. In some embodiments, an off-site crane operation center includes a remote operations dashboard for presenting crane operational information to an operator. For example, the dashboard may include real-time display of information corresponding to operational data received from the remotely operated crane, such as operational parameters of the crane and video images of the jobsite. The combination of the video information, the audio information, the proximity information, and the information provided via the dashboard, may enable an operator to fully monitor and control operations of the crane in real-time, from an off-site crane operation center, as if physically present at the jobsite.

In some embodiments, a remote crane system includes an activation system that provides for selective enablement and disablement of remote control of the crane. For example, one or both of the remote controlled crane system and the RCCC may have an activation system that can be enabled to provide for the transmission, receipt and execution of remote commands generated using remote crane controls of the RCCC. Such a system may enhance safety by ensuring that remote control is accomplished only when desired.

In some embodiments, a local remote crane control activation system (or "local activation system") located at the crane system is operable to allow persons at the jobsite to selectively enable or disable remote control of the crane. For example, the local activation system may include a remote activation switch that can be toggled between an active ("on") position and inactive ("off") position to enable or disable, respectively, remote control of the crane by way of remote control commands transmitted to the crane from the RCCC by way of the remote communication network. In some embodiments, a channel tasked with receiving the remote control commands from the RCCC is activated or deactivated to enable or disable receipt of the remote control commands. For example, a control board of the network interface tasked with receiving the remote control commands by way of the network may be turned on or off to allow or prevent, respectively, receipt of the remote control commands by the crane's local controller. In such an embodiment, the crane's local controller would not receive or execute remote commands while the remote activation switch is set to an inactive ("off") position.

In some embodiments, a remote crane control activation system (or "remote activation system") located at the RCCC is operable to allow persons at the RCCC to selectively enable or disable remote control of the crane from the RCCC. For example, the remote activation system may include a remote activation switch that can be toggled between an active ("on") position and inactive ("off") position to enable or disable, respectively, transmission of remote commands to the crane from the RCCC by way of the remote communication network. In some embodiments, the RCCC only sends remote control commands to the crane while the RCCC's remote activation system is enabled. For example, in response to a controller of the RCCC receiving a command by way of the remote crane controls of the RCCC, the controller may determine a status of the RCCC's remote activation system. This may, for example, be accomplished by the controller polling a remote activation status bit that is set to correspond to the current state of the RCCC's remote activation system. In response to determining that the RCCC's remote activation system is active, the controller may send, to the crane by way of the network, crane remote control data corresponding to the command. In response to determining that the RCCC's remote activation system is inactive, the controller may not send data corresponding to the command to the crane. In such an embodiment, the RCCC's controller would only send data commanding operations of the crane while the RCCC's remote activation switch is set to an active position.

Embodiments may enable "on-demand seat-time" allowing an operator to monitor or operate a crane at a remote jobsite on an as-needed basis, without having to travel to, or otherwise be physically present at, the jobsite. This can help to eliminate the excessive amounts of travel time and downtime for a crane operator. Moreover, if there are multiple jobs for which seat-time is relatively short in comparison to travel and downtime, a remotely operated crane can be provided at the each of the respective jobsites, and all of the remotely operated cranes can be monitored and controlled from a single off-site crane operation center. In such an embodiment, one or more remote crane operators may monitor or control each of the remotely operated cranes on-demand, from an off-site crane operation center (e.g., a RCCC). This can provide an economically beneficial allocation of operator resources, while reducing travel time, reducing downtime, and improving safety.

FIG. 1 is a block diagram that illustrates a remotely operated crane system ("ROC system") 100 in accordance with one or more embodiments. In the illustrated embodiment, the ROC system 100 includes a remote controlled crane system (or "crane system") 102 and a remote crane control center (or "RCCC") 104 communicatively coupled to one another by way of a communication network (or "network") 106.

In some embodiments, the crane system 102 is located at a jobsite, such as a well-site located in a rural area, and the RCCC 104 is located remote (or "off-site") from the jobsite, such as a crane control center located in a town near the jobsite. Off-site may be defined by the RCCC 104 being located at least 5 kilometers (km), 10 km, 20 km, 30 km, 40 km, 50 km, 100 km, 200 km or more from the jobsite. Embodiments described may enable a remote operator to monitor and control the crane system 102 remotely, from the RCCC 104, without having to be physically present at the jobsite.

In some embodiments, the network 106 is a long-range data communication network that provides for the communication of data between the crane system 102 and the RCCC 104. The network 106 may provide for half-duplex or full-duplex communication between the crane system 102 and the RCCC 104. A "full-duplex" network configuration may enable simultaneous transmissions from the crane system 102 to the RCCC 104 and from the RCCC 104 to the crane system 102. The network 106 may include a single network, such as a cellular communication network or a satellite communication network, or a combination of multiple networks, such as a cellular communication network and a satellite communication network. As described, in some embodiments, multiple networks are employed to enhance the performance and robustness of the network 106. For example, the network 106 may include a cellular communication network that provides data communication under normal operating conditions and a satellite communication network that acts as a "back-up" that provides data communication in the event data communication by way of the cellular communication network is not available.

In some embodiments, the crane system 102 transmits crane operational data 110 to the RCCC 104 by way of the network 106. The crane operational data 110 may include data regarding operation of the crane system 102, such as crane operating parameters (e.g., boom direction, boom angle, boom length, boom radius, load block height, load weight, outrigger status, hydraulic fluid pressure, engine temperature, engine oil pressure, engine voltage, and fuel level of the crane system 102) or crane environment data (e.g., video, audio or proximity data indicative of the status of the environment in and around the crane system 102).

In some embodiments, the RCCC 104 transmits crane remote control data 112 to the crane system 102 by way of the network 106. The crane remote control data 112 may include data regarding operation and control of the crane system 102, such as crane control data (e.g., commands to operate the crane system 102 in a prescribed manner, such as to raise, lower or extend the boom of the crane system 102) or crane informational data (e.g., audio commands spoken by a remote operator located at the RCCC 104).

In some embodiments, the crane system 102 includes a local crane controller ("crane controller") 120, a local crane sensing system ("sensing system") 122, a local crane operator interface ("local operator interface") 124, a network interface ("crane network interface") 126 and a local crane audio system 128. The local operator interface 124 may include a local crane operations dashboard ("local dashboard") 130, local crane controls ("local controls") 132 and a local remote crane control activation system ("local RCCAS") 134.

In some embodiments, the RCCC 104 includes a remote crane operator interface ("remote operator interface") 140, a network interface ("RCCC network interface") 142, a remote crane controller ("RCC" or "RCCC controller") 144, and a remote operations log ("remote log" or "RCCC log") 146. The remote operator interface 140 may include a remote crane operations dashboard ("remote dashboard") 150, remote crane controls ("remote controls") 152, a remote crane audio system 154 and a remote crane control activation system ("RCCAS" or "remote RCCAS") 156.

In some embodiments, the crane controller executes operational control of the crane system 102. This can include, for example, collecting data regarding the status of the crane system 102, forwarding corresponding crane operational data 110 to the RCCC 104, receiving crane remote control data 112 from the RCCC 104, processing the data collected and received, and executing operational control of the crane system 102 (e.g., control or movement of a boom of the crane system 102) based on the data collected and received. During local control operations, the crane controller 120 may control operation of the crane system 102 based on manipulation of the local controls 132. For example, in response to a local operator located in an operating cabin of the crane system 102 moving a joystick of the local controls 132 in a manner to raise the boom of the crane system 102, corresponding local command data may be transmitted from the local controls 132 to the local crane controller 120. In response to the crane controller 120 receiving the local command data, the crane controller 120 may proceed to control operation of the crane system 102 to raise the boom of the crane system 102. During remote control operations, the crane controller 120 may control operation of the crane system 102 based on manipulation of the remote controls 152. For example, in response to a remote operator located in a simulated operating cabin at the RCCC 104 moving a joystick of the remote controls 152 in a manner to raise the boom of the crane system 102, corresponding crane remote control data 112 may be transmitted from the RCCC 104 to the local crane controller 120 by way of the network 106. In response to the crane controller 120 receiving the crane remote control data 112, the crane controller 120 may proceed to control operation of the crane system 102 to raise the boom of the crane system 102.

In some embodiments, the local crane sensing system 122 includes sensors for sensing operational or environmental characteristics of the crane system 102. The sensing system 122 can include, for example, operational sensors for sensing operational characteristics of the crane system 102, such as boom direction sensors, boom angle sensors, boom length sensors, boom radius sensors, load block height sensors, load weight sensors, outrigger status sensors, hydraulic fluid pressure sensors, engine temperature sensors, engine oil pressure sensors, engine voltage sensors, or fuel level sensors, for sensing boom direction, boom angle, boom length, boom radius, load block height, load weight, outrigger status, hydraulic fluid pressure, engine temperature, engine oil pressure, engine voltage or fuel level, respectively. The sensing system 122 can include, for example, environmental sensors for sensing environmental characteristics of the crane system 102, such as video sensors (e.g., cameras), audio sensors (e.g., microphones) or proximity sensors (e.g., lidar sensors), for capturing video of the crane system 102 or jobsite (e.g., for capturing video of views of the boom, views of the load and views of ROIs around the crane system 102), capturing audio for the crane or jobsite (e.g., for capturing the sounds around the crane, such as persons near the crane talking to one another or the crane operator), or for sensing proximity of objects (e.g., for sensing the presence of persons or objects in regions of interest near the crane system 102), respectively.

In some embodiments, the local controls 132 include controls located at the crane system 102, that can be used by an operator physically present at the crane system 102 (a "local crane operator") to control operation of the crane system 102. The local controls 132 may include, for example, controls located in a crane operating cabin of the crane system 102 located at a jobsite, which can be used by a local crane operator physically present in the cabin of the crane system 102 to control operation of the crane system 102 locally, from the jobsite. The local controls 132 may include, for example, joysticks (e.g., for controlling left/right and forward/aft movement of the boom), foot pedals (e.g., for controlling retraction/extension of the boom or pump pressure) or switches (e.g., for controlling winding/unwinding of load line). A local crane operator may sit in an operator seat located in the cabin and, while seated in the cabin, use her/his hands to control the joystick, use her/his feet to control the foot pedals, or use her/his hands or feet to control the switches, to "locally" control operation of the crane system 102. As described, a local crane operator may monitor a local crane operations dashboard 130 located in the operating cabin of the crane system 102 to determine a status of the crane system 102 and operate the crane system 102 based on the information presented by way of the local crane operations dashboard 130 and environmental conditions at the jobsite observed from the cabin, by the local crane operator. For example, during a lift operation, a local crane operator may, from the operator cabin of the crane system 102, watch and listen to personnel on-the-ground, such as an oiler (e.g., a person responsible for making connections for the lift and acting as a spotter) and a signalman (e.g., a person responsible for signaling directions for maneuvering the load), monitor the local crane operations dashboard 130 to assess a status of the crane system 102 and the lift operation, and manipulate the local controls 132 to execute the lift operation in a safe and efficient manner.

In some embodiments, the local controls 132 include a local emergency stop control ("local e-stop control") 133, such as a switch or similar selective control device that can be activated to disable certain operational aspects of the crane system 102. For example, the local e-stop control 133 may include a "e-stop" switch that can be toggled, by a local operator, from an inactive position to an active position to disable certain operational aspects of the crane system 102. The local e-stop control 133 may include, for example, a button that can be pressed by a local operator to initiate an "emergency stop" operation to disable certain operational aspects of the crane system 102. In some embodiments, certain components of the crane system 102 are placed in a fail-safe state in response to activation of the local e-stop control 133. For example, in response to a local operator activating the local e-stop control 133 (and the local crane controller 120 receiving a signal indicative of activation of the local e-stop control 133), the local crane controller 120 may invoke an emergency stop ("e-stop") procedure that places components of the crane system 102 into a fail-safe state. This may include, for example, inhibiting operations of components of the lifting system 204 and activating an audible alarm that is broadcast by the internal and external speaker system. In some embodiments, placing a component of the crane system 102 in a fail-safe state may include disconnecting power from the component (e.g., so that it cannot move or operate) or controlling the component in a predefined a manner (e.g., to move to a predetermined position). For example, an e-stop procedure may include the local crane controller 120 implementing fail-safe operations that include removing power from a pump controlling the lift cylinder 226, removing power the winch 228 and removing power from other devices in an effort to prevent further movement of the boom 220 and the load block 224. In some embodiments, following an e-stop procedure (e.g., after the local e-stop control 133 is activated), a re-activation of the crane system 102 includes re-activating various components of the crane system 102. For example, re-activation of the crane system 102 may require a local operator to, for each operational system (e.g., the lift cylinder 226, the winch 228, and so forth), manual cycle a respective enablement switch to re-activate the system. Such a local e-stop system may enable a local operator to quickly and easily place the crane system 102 into a safe state in the event an emergency, and inhibit inadvertent re-activation of the crane system 102.

In some embodiments, the local crane operations dashboard 130 presents information regarding the current operational state of the crane system 102 (or "crane operational information"). The local dashboard 130 may include, for example, a display screen, lights or audible devices (e.g., speakers, buzzers or sirens) that present information regarding the current operational and environmental characteristics of the crane system 102. The operational and environmental characteristics may include, for example, a boom direction, a boom angle, a boom length, a boom radius, a load block height, a load weight, an outrigger status, a hydraulic fluid pressure, an engine temperature, an engine oil pressure, an engine voltage, a fuel level, video of the crane system 102 or jobsite (e.g., video of the boom, the load, the area under the load, or the area around the crane system 102), or an indication of the presence of persons or objects near the crane system 102 (e.g., a mapping showing the presence of persons or objects in a region of interest (ROI), such as in a fall-zone of the crane system 102).

In some embodiments, the local crane audio system 128 communicates audio information locally, at the crane system 102. For example, the local crane audio system 128 may capture and communicate job-site audio, including jobsite operator audio (e.g., audible instructions spoken by a local crane operator located in cabin of the crane system 102 and intended to be communicated to on-the-ground personnel located around the crane system 102, at the jobsite) or jobsite environmental audio (e.g., the sounds around the crane system 102 or audible feedback spoken by on-the-ground personnel around the crane system 102, that is intended to be communicated to a local or remote crane operator). In some embodiments, the local crane audio system 128 includes an external microphone system, an internal microphone system, an external speaker system, and an internal speaker system. The external microphone system may include one or more microphones located outside an operating cabin of the crane system 102 for sensing jobsite environmental audio. The internal microphone may include one or more microphones located inside an operating cabin of the crane system 102 for sensing jobsite operator audio. The external speaker system may include one or more speakers located outside an operating cabin of the crane system 102 for broadcasting audio information, such as alarms jobsite operator audio, or remote operator audio, to the area around the crane system 102 (e.g., for broadcasting audio information to on-the-ground personnel located around the crane system 102). The internal speaker system may include one or more speakers located inside an operating cabin of the crane system 102 for broadcasting audio information, such as alarms or jobsite environmental audio, into the cabin of the crane system 102 (e.g., broadcasting audio to a local crane operator located inside the cabin of the crane system 102). Audio may be broadcast to a local crane operator in a cabin of the crane system 102 by way of the internal speaker system in parallel with the information displayed on the local dashboard 130.

In some embodiments, the local remote crane control activation system ("local RCCAS") 134 provides for selective enablement and disablement of remote control of operations of the crane system 102. For example, the local RCCAS 134 may be set to an active state ("enabled" or "on" state) that enables or otherwise facilitates remote control of the crane system 102 by a remote operator, such as an operator providing operational commands using the remote controls 152 of the RCCC 104. Conversely, the local RCCAS 134 may be set to an inactive state ("disabled" or "off" state) that disables or otherwise inhibits remote control of the crane system 102 by a remote operator, such as an operator providing operational commands by way of the remote controls 152 of the RCCC 104.

In some embodiments, the local RCCAS 134 includes a remote state control (RSC) ("local RSC") 160, such as a switch or similar selective control device that can be set to an active or inactive state to enable or disable, respectively, remote control of the crane system 102. For example, the local RSC 160 may include a "remote enable" switch that can be toggled between an active position and an inactive position to enable or disable, respectively, remote control of the crane system 102 by a remote operator, such as an operator providing operational commands by way of the remote controls 152 of the RCCC 104.

In some embodiments, while the local RCCAS 134 is set to an active state, the crane controller 120 executes operational control of the crane system 102 based on remote control commands received from a remote entity, such as the RCCC 104. For example, when the local RCCAS 134 is set to an active state (e.g., when the remote enable switch of the RCCAS 104 is toggled to an "on" position) and remote control data 112 including a command to raise the boom of the crane system 102 is sent to the crane system 102 from the RCCC 104, the crane controller 120 may receive the data 112 and identify the command in the data 112 and, in response, control the devices of the crane system 102 to raise the boom. Thus, the crane system 102 would "follow" the remote commands provided by the RCCC 104 while the local RCCAS 134 is set to an active state.

In some embodiments, while the local RCCAS 134 is set to an inactive state, the crane controller 120 does not execute operational control of the crane system 102 based on remote control commands received from a remote entity, such as the RCCC 104. For example, when the local RCCAS 134 is set to an inactive state (e.g., when the remote enable switch of the RCCAS 104 is toggled to an "off" position) and remote control data 112 including a command to raise the boom of the crane system 102 is sent to the crane system 102 from the RCCC 104, the crane controller 120 may not receive the data 112 or would otherwise ignore the data 112, such that the crane controller 120 does not control the devices of the crane system 102 to raise the boom as commanded by the RCCC 104. Thus, the crane system 102 would not "follow" the remote commands provided by the RCCC 104 while the local RCCAS 134 is set to an inactive state.

In some embodiments, while the local RCCAS 134 is set to an inactive state, the crane controller 120 disables receipt or processing of the remote control commands, such as remote control commands embedded in crane remote control data 112 received from the RCCC 104. For example, while the local RCCAS 134 is set to an inactive state (e.g., while the remote enable switch of the RCCAS 104 is toggled to an "off" position), the crane controller 120 may disable a channel of the network interface 126 on which the crane remote control data 112 is received, or power down a processor tasked with processing the incoming crane remote control data 112, to effectively "block" receipt or processing of remote control commands embedded in crane remote control data 112 received from the RCCC 104. As a result, the crane controller 120 may not effectively receive remote control commands sent from the RCCC 104, or not execute operational control of the crane system 102, based on the remote control commands sent from the RCCC 104. In some embodiments, while the local RCCAS 134 is set to an inactive state (e.g., while the remote enable switch of the RCCAS 104 is toggled to an "off" position), the crane controller 120 may disable a channel of the network interface 126 on which the crane operational data 110 is sent, or power down a processor tasked with processing the outgoing crane operational data 110. This may effectively prevent sending of crane operational data 110 to the RCCC 104 while the local RCCAS 134 is set to an inactive state. In some embodiments, while the local RCCAS 134 is set to an inactive state (e.g., while the remote enable switch of the RCCAS 104 is toggled to an "off" position), the crane controller 120 may maintain enablement of a channel of the network interface 126 on which the crane operational data 110 is sent, and maintain power and operation of a processor tasked with processing the outgoing crane operational data 110. This may effectively maintain sending of crane operational data 110 to the RCCC 104 while the local RCCAS 134 is set to an inactive state.

In some embodiments, the network interface 126 provides an interface with the network 106 for communicating data between the crane system 102 and the RCCC 104. For example, the network interface 126 may provide for the transmission of crane operational data 110 from the crane system 102 to the RCCC 104 by way of the network 106 or the receipt of crane remote control data 112 by the crane system 102 from the RCCC 104 by way of the network 106. In some embodiments, the network interface 126 dynamically selects an appropriate communications channel for the transmission and receipt of data based on operational characteristics of the network 106. For example, the network 106 may include a primary network channel (e.g., a cellular communication network) and a secondary network channel (e.g., a satellite communication network). In response to the network interface 126 determining that communication can be established with the RCCC 104 by way of the primary network channel, the network interface 126 may transmit data (e.g., crane operational data 110) to the RCCC 104 by way of the primary network channel. In response to the network interface 126 determining that that communication cannot be established with the RCCC 104 by way of the primary network channel and that communication can be established with the RCCC 104 by way of a secondary network channel, the network interface 126 may proceed to transmit data (e.g., crane operational data 110) to the RCCC 104 by way of the secondary network channel. In some embodiments, the network interface 126 may transmit an indication of the unavailability of the primary network channel, or the availability of the secondary network channel, to the RCCC 104 by way of the secondary network channel. Such an indication may be used by the RCCC 104 in its own determination of the unavailability of the primary network channel and the availability of the secondary network channel. In some embodiments, a cellular network is reserved as the primary network channel based on its relatively low cost, and a satellite communication channel is reserved as the secondary network channel based on its relatively high reliability. This may reduce network costs (e.g., by conserving the relatively expensive satellite communications channel resource) and improve network performance (e.g., by improving the availability and performance of the satellite communications channel by reducing data throughput on the satellite communications channel).

In order to operate the crane system 102 in a safe an efficient manner, it is important that crane operational data 110 be transmitted to the RCCC 104 from the crane system 102 with little to no delay and that crane remote control data 112 be transmitted from the RCCC 104 to the crane system 102 with little to no delay. Minimal delay in the transmission of crane operational data 110 and the crane remote control data 112 can enable real-time remote monitoring and control of the operation of the crane system 102. Real-time remote monitoring may include less than a two second delay between the time data is sensed at the crane system 102 and the time corresponding data is presented at the RCCC 104. Real-time remote control may include less than, for example, a two second delay between the time a command is issued or data is generated at the RCCC 104 and the time it is executed or presented at the crane system 102. In some embodiments, determining whether communication can be established includes determining whether the communication channel is capable of supporting real-time remote monitoring and control of the operation of the crane system 102. For example, if a network delay of less than one second is required to facilitate real-time remote monitoring and control of the operation of the crane system 102, determining whether communication can be established may include the network interface 126 monitoring a delay of the respective network channels of the network 106 in communicating data between the crane system 102 and the RCCC 104, and for each of the network channels, in response to determining that the delay for a network channel satisfies a threshold delay (e.g., a delay less than or equal to about one second), the network interface 126 determining that communication can be established by way of that network channel, and, in response to determining that the delay for a network channel does not satisfy the threshold delay (e.g., a delay greater than about one second), the network interface 126 determining that communication cannot be established by way of the network channel. In the event no network channel satisfies the threshold delay, the network interface 126 may provide an indication of unavailability of a network channel to the crane controller 120, and the crane controller 120 may disable remote operation of the crane and enable local control of the crane system 102. In the event that a network channel subsequently satisfies the threshold delay, the network interface 126 may provide an indication of such to the crane controller 120, and the crane controller 120 may re-enable remote operation of the crane such that the crane system 102 can be controlled remotely (e.g., by way of the remote controls 152 of the RCCC 104). In some embodiments, the network delay for a network channel can be determined by measuring the delay associated with sending a test packet of data between the network interface 126 of the crane system 102 and the network interface 142 of the RCCC. For example, the network interface 126 of the crane system 102 may send, to the network interface 142 of the RCCC 104 by way of the network channel, a test packet of data and request that the network interface 142 respond with a time of receipt of the test packet of data. The network interface 126 may determine the delay to be the difference between the time the test packet of data was sent and the reported time of receipt.

In some embodiments, the RCCC 104 is a center for executing remote monitoring and control of one or more remotely controlled crane systems. For example, the RCCC 104 may be a central crane control and command center housing one or more simulated operating cabins that can be used by one or more remote (or "off-site") crane operators to monitor and control operations of one or more remote controlled crane systems at one or more jobsites in a manner similar to that of local (or "on-site") crane operators located in operating cabins of the respective remote controlled crane systems. In place of having direct audible and visual contact with a crane system at a job-site, the load and the environment surrounding the crane (e.g., including on-the-ground personnel), the RCCC 104 may provide video and audio feeds from the job-site that act at the eyes and ears of the remote crane operator. In some embodiments, a simulated operating cabin includes some or all of the same elements present in an operating cabin of a crane system. For example, a simulated cabin may include a remote crane operator interface having a remote crane operations dashboard and remote crane controls. In some embodiments, the simulated cabin may be arranged in a manner similar to that of an operating cabin of a crane system, such as the remote controlled crane system to be remotely controlled from the simulated operating cabin. For example, the remote dashboard and the remote crane controls of a simulated cabin may be physically arranged similar to that of the local crane operations dashboard and local crane controls of the remotely controlled crane system to be remotely controlled from the simulated cabin. In some embodiments, the remote dashboard for use in controlling a remote controlled crane system provides for the display of external cabin video, internal cabin video, lift system video, lift video, perimeter video or fall-zone video acquired from the crane system.

In some embodiments, the remote crane controls 152 include controls physically located at the RCCC 104 that can be used by a remote crane operator physically present at the RCCC 104 to control operation of the crane system 102. The remote controls 152 may include, for example, controls located in a simulated crane operating cabin at the RCCC 104, which can be used by a remote crane operator to control operation of the crane system 102 remotely, from the RCCC 104. The remote controls 152 may physically mimic the layout and positioning of the local controls 132 of the crane system 102. This may allow an operator to move between the cabin of the crane system 102 and the simulated cabin of the RCCC 104 without a significant learning curve. The remote controls 152 may include, for example, joysticks (e.g., for controlling left/right and forward/aft movement of the boom), foot pedals (e.g., for controlling retraction/extension of the boom or pump pressure) or switches (e.g., for controlling winding/unwinding of the load line). A remote crane operator physically present at the RCCC 104 may sit in an operator seat located in the simulated operating cabin and, while seated in the simulated cabin, use her/his hands to control the joystick, use her/his feet to control the foot pedals or use her/his hands or feet to control the switches, to remotely control operation of the crane system 102. As described, the remote crane operator may monitor the remote operator interface 140 located in the simulated cabin to determine a status of the crane system 102 and to operate the crane system 102 based on the information presented by way of the remote operator interface 140. For example, to conduct a lift operation, a remote crane operator may, from the simulated cabin, watch and listen to personnel on-the-ground, such as an oiler (e.g., a person responsible for making connections for the lift and acting as a spotter) and a signalman (e.g., a person responsible for signaling directions for maneuvering the load) by way of video and audio feeds presented at the remote operator interface 140, monitor the remote crane operations dashboard 150 to assess a status of the crane system 102 and the lift operation, and manipulate the remote controls 152 to execute remote control of crane system 102 in a safe and efficient manner.

In some embodiments, the remote controls 152 include a remote emergency stop ("remote e-stop control") 153, such as a switch or similar selective control device that can be activated to disable certain operational aspects of the crane system 102. For example, the remote e-stop control 153 may include a remote "e-stop" switch that can be toggled, by a remote operator, from an inactive position to an active position to disable certain operational aspects of the crane system 102. The remote e-stop control 153 may include, for example, a button that can be pressed by a remote operator to initiate an "emergency stop" operation to disable certain operational aspects of the crane system 102. In some embodiments, certain components of the crane system 102 are placed in a fail-safe state in response to activation of the remote e-stop control 153. For example, in response to a remote operator activating the remote e-stop control 153 (and the remote crane controller 144 receiving a signal indicative of activation of the remote e-stop control 153), the remote crane controller 144 may control the RCCC 104 to send, to the RCCS 102 by way of the network 106, a remote e-stop command that is intended to command the RCCS 102 to invoke an emergency stop ("e-stop") procedure. In response to receipt of the remote e-stop command, the local crane controller 120 may invoke an emergency stop ("e-stop") procedure, as describe here.

In some embodiments, the remote crane operations dashboard 150 presents information regarding the current operational state of the crane system 102. The remote crane operations dashboard 150 may reproduce the contents of the local dashboard 130 at the crane system 102. This may allow an operator to move between the operating cabin of the crane system 102 and the simulated cabin of the RCCC 104 without a significant learning curve. The remote dashboard 150 may include, for example, a display screen, lights or audible devices (e.g., speakers, buzzers, or sirens) that present information regarding the current operational and environmental characteristics of the crane system 102. The operational and environmental characteristics may include, for example, a boom direction, a boom angle, a boom length, a boom radius, a load block height, a load weight, an outrigger status, a hydraulic fluid pressure, an engine temperature, an engine oil pressure, an engine voltage, a fuel level, video of the crane or jobsite (e.g., video of the boom, the load, the area under the load, or the area around the crane system 102), or an indication of the presence of persons or objects near the crane system 102 (e.g., a mapping showing the presence of persons or objects in a ROI, such as in a fall-zone of the crane system 102).

In some embodiments, the remote crane audio system 154 communicates audio information remotely, at the RCCC 104. For example, the remote crane audio system 154 may provide for capturing and communicating remote audio, including remote operator audio (e.g., audible instructions spoken by a remote operator located in a simulated cabin of the crane system 102 at the RCCC 104 and intended to be communicated to on-the-ground personnel around the crane system 102, at the jobsite), or communicating jobsite audio to a remote crane operator at the RCCC 104 (e.g., communicating the sounds around the crane system 102 or audible feedback spoken by on-the-ground personnel around the crane system 102 that is intended to be communicated to the crane operator, to a remote crane operator at the RCCC 104). In some embodiments, the remote crane audio system 154 includes a remote microphone system and a remote speaker system. The remote microphone system may include one or more microphones located inside the simulated cabin of the crane system 102 for sensing remote operator audio. The remote speaker system may include one or more speakers located inside the simulated operating cabin of the crane system 102 for broadcasting information, such as alarms or jobsite environmental audio at the simulated cabin. Audio may be presented to the remote operator in the simulated cabin by way of the speaker system in parallel with information displayed on the remote dashboard 150.

In some embodiments, the remote crane controller ("RCC" or "RCCC controller") 144 executes operational control of the RCC 104. This can include, for example, collecting crane operational data 110, processing the crane operational data 110, presenting the content of the crane operational data 110 by way of the remote operator interface 140, receiving and processing control signals from the remote crane controls 152, forwarding corresponding crane remote control data 112 (e.g., including operational commands corresponding to control signals received from the remote crane controls 152) to the crane system 102, and generating a remote operations log 146. For example, in response to the RCC 144 receiving control signals generated by a joystick of the remote crane controls 152 as a result of a remote operator located in a simulated operating cabin at the RCCC 104 moving the joystick in a manner to command raising of the boom of the crane system 102, the RCC 144 may process the control signals to identify the command to raise the boom of the crane system 102, and, in turn, generate and transmit, to the crane system 102 by way of the network 106, corresponding crane remote control data 112 that includes a corresponding command to raise of the boom of the crane system 102.

In some embodiments, the remote crane control activation system ("RCCAS" or "remote RCCAS") 156 provides for selective enablement and disablement of remote control of a crane system (e.g., the crane system 102) by way of the RCC 104. For example, the remote RCCAS 156 may be set to an active state ("enabled" or "on" state) that enables or otherwise facilitates remote control of a crane system by way of the RCC 104, such as by way of operational commands generated using the remote controls 152 of the RCCC 104. Conversely, the remote RCCAS 156 may be set to an inactive state ("disabled" or "off" state) that disables or otherwise inhibits remote control of a crane system by way of the RCC 104, such as by way of the remote controls 152 of the RCCC 104.

In some embodiments, the remote RCCAS 156 includes a remote state control (RSC) ("remote RSC") 170, such as a switch or similar selective control device that can be set to an active or inactive state to enable or disable, respectively, remote control of a crane system by way of the RCC 104. The remote RSC 170 may be positioned at or near the remote crane controls 152 such that a remote operator located in a simulated operating cabin at the RCCC 104 can engage the remote RSC 170 to selectively activate ("enable") or deactivate ("disable") remote control of a crane system (e.g., crane system 102) by way of the remote crane controls 152 of the RCC 104.

In some embodiments, the remote RSC 170 includes a "remote enable" switch that can be toggled between an active position and an inactive position to activate and deactivate, respectively, the RCCAS 156 and, in turn, enable or disable, respectively, remote control of a crane system (e.g., the crane system 102) by way of operational commands generated by an operator using the remote controls 152 of the RCCC 104. The switch may include, for example, a physical toggle switch, button, or similar physical selection element that can be physically manipulated by an operator between an active state and an inactive state. The switch may include, for example, a virtual toggle switch, button, or similar virtual selection element that is presented (e.g., a graphical switch displayed on a graphical display of the remote operator interface 140) so that it can be used by a remote operator to select between active and inactive states.

In some embodiments, the remote RSC 170 employs an access control device 172, such as a key or other unique item. This may help to prevent unauthorized personnel from enabling remote control of a crane system by way of the RCC 104. For example, a limited number of "approved" operators may be issued an "approved" key-type access control device 172 such that only a limited number of persons possessing an "approved" access control device 172 have the ability to activate and deactivate, respectively, the RCCAS 156 and, in turn, enable and disable, respectively, remote control of a crane system (e.g., crane system 102), by way of the remote RSC 170 of the RCC 104.

In some embodiments, the access control device 172 includes a physical key. For example, the access control device 172 may include a uniquely patterned key that is inserted into a corresponding key slot located at the remote operator interface 140 and is turned (similar to a traditional vehicle ignition) to employ the key to activate the remote RSC 170 and, in turn, activate and deactivate, respectively, the RCCAS 156 and, in turn, enable/disable remote control of a crane system (e.g., crane system 102) by way of the remote RSC 170 of the RCC 104. In some embodiments, the access control device 172 includes a physical token. For example, the access control device 172 may include a radio frequency identification (RFID) token (e.g., a RFID tag or RFID card) having identification information that can be positioned within communication range of a complementary RFID reader (e.g., a RFID transceiver) located at the remote operator interface 140 to employ the RFID token. The RFID reader may interrogate the RFID token obtain the identification information from the RFID (e.g., to cause the RFID token to transmit a unique code stored on the RFID token that is received by the RFID reader). The RCC 144 may compare the identification information to "authorized" identification information (e.g., a listing of codes associated with persons having sufficient access to remote control of the crane system 102 stored at the RCC 104) to determine whether the identification information matches the "authorized" identification information (e.g., whether the unique code is contained in the listing), and in response to determining that the identification information matches, activate the remote RSC 170 and, in turn, activate the RCCAS 156 and enable remote control of a crane system (e.g., crane system 102) by way of the remote RSC 170 of the RCC 104, or, in response to determining that the identification information does not match, disable the remote RSC 170 and, in turn, deactivate the RCCAS 156 and disable remote control of a crane system (e.g., crane system 102) by way of the remote RSC 170 of the RCC 104.

In some embodiments, the remote RCCAS 156 employs a redundant access control system that employs use of an access control device in coordination with selection of enablement/disablement of remote control of a remote crane system. For example, the remote RCCAS 156 may require that an "approved" access control device 172 is employed before allowing the remote RSC 170 to be used select the state of the remote RCCAS 156 and, in turn, remote control of a crane system by way of the RCC 104. In some embodiments, the ability to selectively enable or disable remote control of a crane system by way of the remote RSC 170 may be enabled when an "approved" access control device 172 is employed, and the ability to selectively enable or disable remote control of a crane system by way of the remote RSC 170 may be disabled or otherwise inhibited when an "approved" access control device 172 not employed. For example, while an approved key is not employed (e.g., a physical key is not inserted and turned, or a RFID token is not in range of a RFID reader of the RCCAS 156), toggling of a physical switch may be inhibited or not result in a change of the state of remote control such that the state of remote control cannot be changed by way of the physical switch, or a virtual switch may be disabled or not presented to the operator such that the state of remote control cannot be changed by way of the virtual switch. While an approved key is employed (e.g., a physical key is inserted and turned, or an "approved" RFID token is in range of the RFID reader of the RCCAS 156), toggling of a physical switch may be registered and result in a change of the state of remote control such that the state of remote control can be changed by way of the physical switch, or a virtual switch may be displayed or otherwise presented to the operator such that the state of remote control can be changed by way of the virtual switch. In some embodiments, the remote RCCAS 156 is activated only when an "approved" access control device 172 is employed and the remote RSC 170 is set to an active state. For example, the remote RCCAS 156 may be activated (and, in turn, remote control of a crane system (e.g., crane system 102) may be enabled) when an "approved" access control device 172 is employed by an operator and the operator toggles a "remote enable" switch of the remote RSC 170 to an active position. Remote control of the crane system (e.g., crane system 102) may be disabled when an "approved" access control device 172 is not employed by an operator or the "remote enable" switch of the remote RSC 170 is toggled to an inactive position.

In some embodiments, while the remote RCCAS 156 is set to an active state such that remote control of a remote crane is enabled, the RCC 144 provides for transmission of operational commands to a remote crane system. And, conversely, while the remote RCCAS 156 is set to an inactive state such that remote control of the remote crane is disabled, the RCC 144 inhibits transmission of operational commands to the remote crane system. For example, while the remote RCCAS 156 is set to an active state (e.g., when the remote RSC 170 of the RCCAS 104 is toggled to an "on" position) and the RCC 144 receives a control signal generated by a joystick of the remote crane controls 152 as a result of a remote operator located in a simulated operating cabin at the RCCC 104 moving the joystick in a manner to command raising of the boom of the crane system 102, the RCC 144 may determine whether the remote RCCAS 156 is set to an active state (e.g., indicating that remote control of the remote crane is enabled), and, in response to determining that the remote RCCAS 156 is set to an active state, process the signal to identify the command to raise the boom of the crane system 102, generate corresponding crane remote control data 112 that includes a command to raise of the boom of the crane system 102, and transmit, to the crane system 102 by way of the network 106, the crane remote control data 112 that includes the command to raise of the boom of the crane system 102. In such an embodiment, if the local RCCAS 134 is set to an active state ("enabled" or "on" state), the crane controller 120 may control the devices of the crane system 102 to raise the boom, as commanded by the RCCC 104. As a further example, while the remote RCCAS 156 is set to an inactive state (e.g., when the remote RSC 170 of the RCCAS 104 is toggled to an "off" position) and the RCC 144 receives a control signal generated by a joystick of the remote crane controls 152 as a result of a remote operator located in a simulated operating cabin at the RCCC 104 moving the joystick in a manner to command raising of the boom of the crane system 102, the RCC 144 may determine whether the remote RCCAS 156 is set to an active state, and, in response to determining that the remote RCCAS 156 is not set to an active state (e.g., is set to an inactive state, indicating that remote control of the remote crane is disabled), the RCCAS 156 may not process the signal to identify the command to raise the boom of the crane system 102, may not generate corresponding crane remote control data 112 that includes a command to raise of the boom of the crane system 102, or not transmit, to the crane system 102 by way of the network 106, crane remote control data 112 that includes the command to raise of the boom of the crane system 102. In such an embodiment, a command to raise the boom may not be transmitted to the crane controller 120.

In some embodiments, the "remote" network interface 142 provides an interface with the network 106 for communicating data between the crane system 102 and the RCCC 104. For example, the network interface 142 may provide for transmission of crane remote control data 112 from the RCCC 104 to the crane system 102 by way of the network 106 or the receipt of crane operational data 110 by the RCCC 104 from the crane system 102 by way of the network 106. In some embodiments, the network interface 142 dynamically selects an appropriate channel for the transmission and receipt of data based on operational characteristics of the network 106. For example, the network 106 may include a primary network channel (e.g., a cellular communication network) and a secondary network channel (e.g., a satellite communication network), and in response to the network interface 142 determining that communication can be established with the crane system 102 by way of the primary network channel, the network interface 142 may transmit data (e.g., crane remote control data 112) to the crane system 102 by way of the primary network channel. In response to the network interface 142 determining that that communication cannot be established with the crane system 102 by way of the primary network channel and that communication can be established with the crane system 102 by way of a secondary network channel, the network interface 142 may transmit data (e.g., crane remote control data 112) to the crane system 102 by way of the secondary network channel. In some embodiments, the network interface 142 transmits an indication of the unavailability of the primary network channel, or the availability of the secondary network channel, to the crane system 102 by way of the secondary network channel. In some embodiments, the network interface 142 determines whether communication can be established by way of a network channel in a manner similar to that described with regard to the network interface 126. For example, the network interface 142 may determine whether communication can be established by way of a network channel based on the network channel satisfying a delay threshold. In some embodiments, the network interface 142 may determine the delay of a network channel in a manner similar to that described with regard to the network interface 126. For example, the network interface 142 may send a test data packet to the network interface 126 by way of a network communication channel and determine a delay for the network communication channel based on the time required for the packet to travel from the network interface 142 to the network interface 126.

In some embodiments, the remote operations log ("remote log" or "RCCC log") 146 provides a log of remote control operations of the RCCC 104. For example, the RCCC log 146 may include a log that identifies periods of remote/local control, identities of one or more remote operators associated with remote control operations, or identifies remote commands generated for a given period of time. For example, where a remote operator enters a simulated operating cabin of the RCCC 104, presents a valid RFID tag-type access control device 172 associated with his/her identity (e.g., operator 1234) and toggles a switch-type remote RSC 170 to enable remote control of the crane system 102, generates (using the remote controls 152) a series of remote commands to raise, turn and lower the boom of the crane system 102 (that are transmitted to the crane system 102 by way of the network 106), and toggles the switch-type remote RSC 170 to disable remote control of the crane system 102, the RCC 144 may record corresponding entries in the RCCC log 146 that specify time, operation, or operator identity associated with the respective remote commands (e.g., 01/01/2021: 2:00 pm: remote control enabled: operator 1234; 01/01/2021: 2:01 pm: raise boom: operator 1234; 01/01/2021: 2:02 pm: turn boom right: operator 1234; 01/01/2021: 2:10 pm: lower boom: operator 1234; 01/01/2021: 2:11 pm remote control disabled: operator 1234; . . . ). Such an operations log may be useful in auditing remote operations of the crane system 100.

Figure 2:
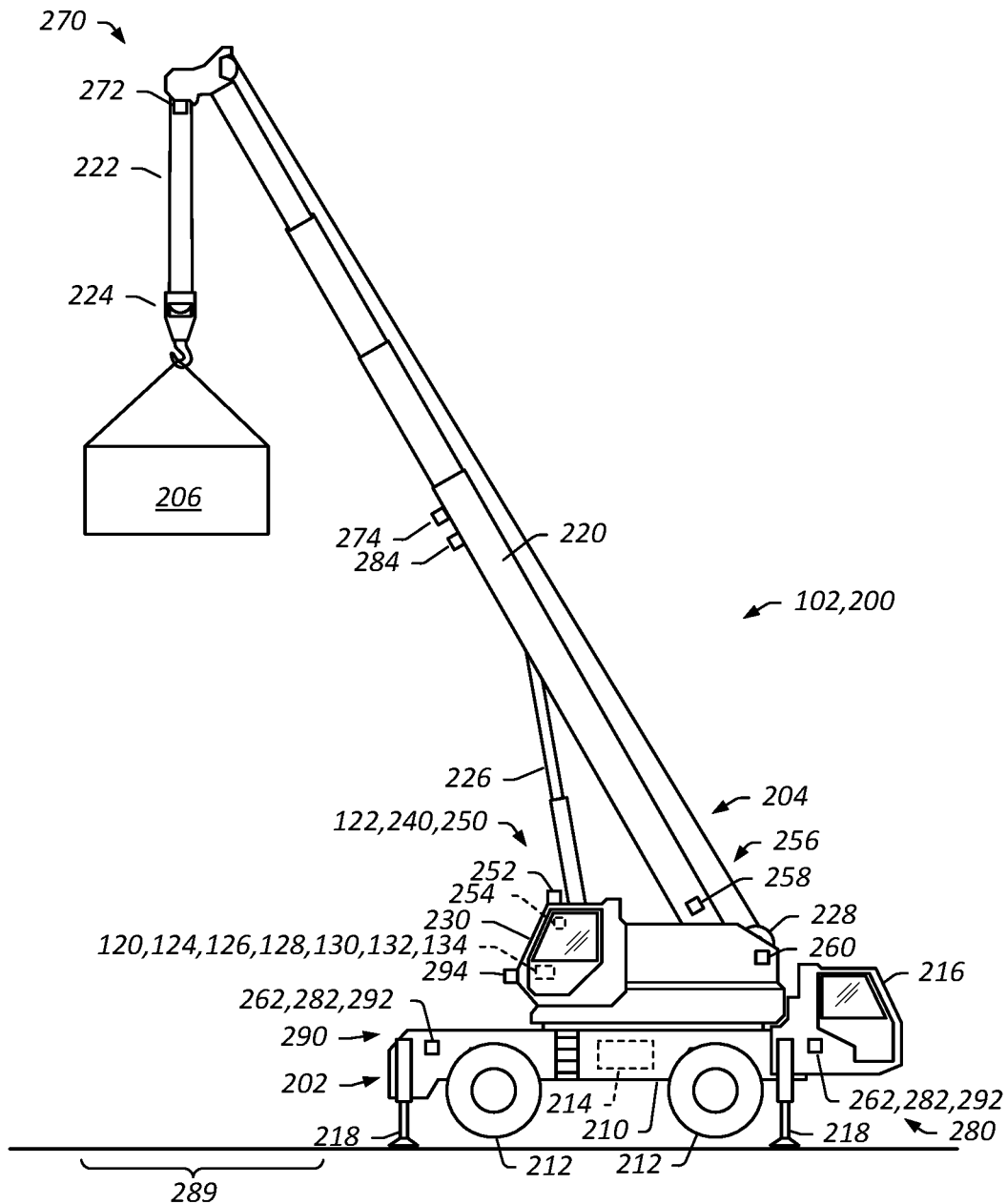
FIG. 2 is a diagram that illustrates a remote controlled crane system in accordance with one or more embodiments.

Embodiments described here can be employed for various type of crane systems. For example, embodiments can be employed for fixed cranes, such as tower cranes, or mobile cranes, such as truck-mounted cranes. FIG. 2 is a diagram illustrates a crane system 102 in accordance with one or more embodiments. In the illustrated embodiment, the crane system 102 includes a truck-mounted mobile crane ("mobile crane") 200 having a chassis 202 and a lifting system 204, which can be employed for lifting a load 206. The chassis 202 includes a frame 210, wheels 212, an engine 214, a driving cabin 216 and outriggers 218. The lifting system 204 includes a boom 220, a load line 222, a load block 224, a lift cylinder 226, a winch 228 and an operating cabin 230. In some embodiments, the crane system 102 includes a local crane controller 120, a local crane sensing system 122, a local crane operator interface 124 (including a local crane operations dashboard 130 and local crane controls 132), a crane network interface 126 and a local crane audio system 128.

The frame 210 may include a rigid structure, such as a steel frame, to which various components of the crane system 102 are mounted. The wheels 212 may be inflatable rubber tires, or similar elements, that facilitate movement of the crane system 102 over terrain, such as roads leading to and from a jobsite or surfaces at the jobsite. The engine 214 may be a diesel engine or a similar power plant that is capable of generating motive power for operating the crane system 102, such as power to drive the wheels 212 during travel of the mobile crane 200 and power to operate hydraulics, winches, motors and other components during operation of the lifting system 204. The driving cabin 216 may include a driver's seat and controls, such as a throttle, a brake pedal, a gear shift and a steering wheel for use in driving the crane system 102, such as to, from or across a jobsite. The outriggers 218 may include arms or similar elements that can be extended outward and downward from the frame 210 to engage the ground or other supportive surfaces to stabilize the crane system 102.

The boom 220 may include an elongated structural member or similar element that can be extended, raised or lowered to position the load line 222 or the load block 224 during a lifting operation. The length or vertical angle of the boom 220 may be varied to achieve a desirable lift height and reach. The load line 222 may include a steel cable or similar element that can be extended or retracted to, for example, raise or lower the load block 224 and a load 206 coupled thereto. The load block 224 may include a hook or similar element for coupling a load 206 to the load line 222. The load block 224 may include, for example, an assembly of a hook, a swivel, a bearing, sheaves, pins and a frame that is suspended by the load line 222. The lift cylinder 226 may include a hydraulic piston or similar element that can be extended or retracted to, for example, raise or lower the boom 220. The winch 228 may include a motor controlled spool or similar device that can be used to extend (e.g., spool out) or retract (e.g., spool in) the load line 222. The operating cabin 230 may include a location from which an operator can control operation of the lifting system 204. The operating cabin 230 may include an enclosed cabin having an operator seat and the local crane operator interface 124 (including the local crane operations dashboard 130 and the local crane controls 132). A crane operator physically present at the jobsite may sit in an operator's seat located in the operating cabin 230 and, while located in the operating cabin 230, use her/his hands and feet to control operation of the crane system 102, monitor the local crane operations dashboard 130 in the operating cabin 230 and visually monitor the environment around the crane system 102 through windows of the operating cabin 230. The operating cabin 230 may include a microphone and a speaker for communicating audibly with personnel outside the operating cabin 230, such as on-the-ground personnel or personnel located at a RCCC. In some embodiments, the lifting system 204 is rotatably mounted to the chassis 202 such that it can be rotated horizontally about a vertical axis, allowing the boom 220, the load line 222 and the load block 224 to be rotated about the chassis 202 in unison. This may allow the crane system 102 to conduct lifting operations in a circular or arc shaped region about the chassis 202. The term "fall-zone" refers to the area in which it is reasonably foreseeable that the load block 224 or some or all of a load 206 suspended by the lifting system 204 could fall in the event of an accident, such as breakage of the load line 222. The fall-zone may include the area directly beneath (or within a threshold distance, such as five meters, of the area directly beneath) the load block 224 or a load suspended by the lifting system 204.

The local crane controller 120 may include an onboard computer or similar device that is capable of executing operational control of the crane system 102. This can include, for example, collecting data regarding the status and crane system 102, forwarding corresponding crane operational data 110 to the RCCC 104, receiving crane remote control data 112 from the RCCC 104, processing the data collected and received, and executing operational control of the crane system 102 (e.g., to raise the boom 220 of the crane system 102) based on the data collected and received. During local control operations, the crane controller 120 may control operation of the crane system 102 based on manipulation of the local controls 132. For example, in response to a local crane operator located in the operating cabin 230 of the crane system 102 moving a joystick of the local controls 132 in a manner to raise the boom of the crane system 102, and corresponding local command data may be transmitted from the local controls 132 to the local crane controller 120. In response to the crane controller 120 receiving the local command data, the crane controller 120 may proceed to control operation of the lift cylinder 226 to raise the boom 220 of the lifting system 204. During remote control operations, the crane controller 120 may control operation of the crane system 102 based on manipulation of the remote controls 152. For example, in response to a remote operator at a simulated operating cabin in the RCCC 104 moving a joystick of the remote controls 152 in a manner to raise the boom 220 of the crane system 102, corresponding remote command data may be transmitted from the RCCC 104 to the local crane controller 120 by way of the network 106 and crane remote control data 112. In response to the crane controller 120 receiving the remote command data, the crane controller 120 may proceed to control operation of the lift cylinder 226 to raise the boom 220 of the lifting system 204.

The local crane sensing system 122 may include sensors for sensing various operational and environmental characteristics of the crane system 102. In some embodiments, the sensing system 122 includes operational sensors 240 for sensing operational characteristics of the crane system 102, such as boom direction sensors, boom angle sensors, boom length sensors, boom radius sensors, load block height sensors, load weight sensors, outrigger status sensors, hydraulic fluid pressure sensors, engine temperature sensors, engine oil pressure sensors, engine voltage sensors or fuel level sensors, for sensing boom direction, boom angle, boom length, boom radius, load block height, load weight, outrigger status, hydraulic fluid pressure, engine temperature, engine oil pressure, engine voltage or fuel level, respectively. Data indicative of the characteristics sensed by the operational sensors 240 ("sensed operational data") may be provided to and received by the crane controller 120 for use in assessing the operational state of the crane system 102.

In some embodiments, the sensing system 122 includes environmental sensors 250 for sensing environmental characteristics of the crane system 102, such as video sensors (e.g., cameras), audio sensors (e.g., microphones) or proximity sensors (e.g., lidar sensors) for capturing video of the crane system 102 or the jobsite (e.g., for capturing video of views of the boom 220, a load 206 suspended from the load block 224, or ROIs around the crane system 102), capturing audio of the crane or jobsite (e.g., for capturing the sounds around the crane system 102, including persons around the crane talking to one another or the crane operator), or for sensing proximity of objects (e.g., for sensing the presence of persons or objects in ROIs near the crane system 102), respectively.

In some embodiments, the environmental sensors 250 include cameras for acquiring images of one or more regions of interest around the crane system 102. For example, the environmental sensors 250 may include one or more cameras for capturing video of the frame 210, the wheels 212, the engine 214, the outriggers 218, the boom 220, the load line 222, the load block 224, a load 206 suspended from the load block 224, the lift cylinder 226, the winch 228, the operating cabin 230, a field-of-view (FOV) out of the front, right and left sides of the operating cabin 230, or one or more ROIs around the crane system 102, such as the fall-zone. In the context of local or remote crane operations, the corresponding views can be helpful in assessing the status of the crane system 102, a lift operation being conducted by the crane system 102 or the status and safety of personnel or objects located around the crane system 102. This may be especially true in the context of remote crane operations in which the remote crane operator is not physically present at the jobsite and does not have the luxury of looking directly outside of the operating cabin 230, or even leaving the operating cabin 230, to assess the status of the crane system 102, a lift operation being conducted by the crane system 102 or the status and safety of personnel or objects around the crane system 102.

In some embodiments, the environmental sensors 250 include one or more external cabin view cameras 252. The external cabin view cameras 252 may include one or more video cameras mounted outside or inside the operating cabin 230. The external cabin view cameras 252 may be oriented to capture video images of a FOV that is the same or similar to what a local operator would see from the seat of the operating cabin 230. For example, the external cabin view cameras 252 may include a center external cabin view camera 252 positioned to acquire images of a front FOV directly in front of the operating cabin 230, a right external cabin view camera 252 positioned to acquire images of a right side FOV that at least partially overlaps the center FOV and extends outward to the right of the operating cabin 230, and a left external cabin view camera positioned to acquire images of a left side FOV that at least partially overlaps the center FOV and extends outward to the left of the operating cabin 230. Video captured by the external cabin view cameras 252 may enable an operator to assess the status of the crane system 102, a lift operation being conducted by the crane system 102 and the environment around the crane system 102. The video captured by the external cabin view cameras 252 may be referred to as "external cabin view video."

In some embodiments, the environmental sensors 250 include one or more internal cabin view cameras 254. The internal cabin view cameras 254 may include one or more video cameras mounted inside of the operating cabin 230. The internal cabin view cameras 254 may be oriented to capture video images of a FOV including the interior of the operating cabin 230. The FOV may include a view of the local crane operator interface 124 or the operator seat located inside the operating cabin 230. Video captured by the internal cabin view cameras 254 may enable an operator to assess the status of the crane system 102 and activity in the operating cabin 230. Moreover, in an embodiment in which the RCCC 104 is unable to acquire or display some or all of the operational data for the crane system 102, a video feed of the local crane operator interface 124 provided by the internal cabin view cameras 254 may enable a remote operator to assess the operational status of the crane system 102. The video captured by the internal video captured by the external cabin view cameras 252 may be referred to as "internal cabin view video."

In some embodiments, the environmental sensors 250 include one or more lift system monitoring cameras 256. The lift system monitoring cameras 256 may include one or more video cameras mounted about the crane system 102 to capture video images of fields-of-view (FOVs) that include operational components of the crane system 102, such as the boom 220, the load line 222, the load block 224, the lift cylinder 226, the winch 228 or the outriggers 218. For example, the lift system monitoring cameras 256 may include a lower boom camera 258 affixed to a lower/proximate end of the boom 220 and oriented toward an upper/distal end of the boom 220 to capture a FOV that includes the boom 220, the lift cylinder 226, and at least the upper portion of the load line 222 proximate the upper/distal end of the boom 220. The lift system monitoring cameras 256 may include one or more hoist cameras 260 affixed to the crane system 102 and oriented to capture a FOV that includes the winch 228. The lift system monitoring cameras 256 may include one or more outrigger cameras 262 affixed to the crane system 102 and oriented to capture a FOV that includes the outriggers 218. Video captured by the lift system monitoring cameras 256 may enable an operator to assess the status of the operational components of the crane system 102, such as the boom 220, the load line 222, the load block 224, the lift cylinder 226, the winch 228, the operating cabin 230 or the outriggers 218. Video captured by the lift system monitoring cameras 256 may be referred to as "lift system video."

In some embodiments, the environmental sensors 250 include one or more lift monitoring cameras 270. The lift monitoring cameras 270 may include one or more video cameras mounted about the crane system 102 to capture video images of a FOVs that include a load 206 suspended from the crane system 102 or corresponding ROIs. For example, as illustrated, the lift monitoring cameras 270 may include a lift line camera 272 affixed to the upper/distal end of the boom 220 and facing downward, generally parallel to the extended load line 222 to capture a FOV that includes the load line 222, the load block 224 and a top view of the load 206. The lift monitoring cameras 270 may include a load camera 274 oriented to capture a FOV including a load 206. The load camera 274 may articulate, such that the FOV can be adjusted to follow the load 206 as it moves relative to the position of the load camera 274. In some embodiments, the orientation of the load camera 274 is controlled to follow the load 206. For example, the local crane controller 120 may process video images captured by the load camera 274 to determine a position of the load 206 and may control the orientation of the load camera 274 to focus on the determined position of the load 206. This may, in effect, cause the FOV of the load camera 274 to automatically follow the load 206. In some embodiments, an operator may view video images captured by the load camera 274 to determine a position of the load 206, and may manually control the orientation of the load camera 274 to focus on the determined position of the load 206. This may, in effect, cause the FOV of the load camera 274 to manually follow the load 206. Video captured by the lift monitoring cameras 256 may enable an operator to assess the status of the load 206 and a corresponding lift operation. Video captured by the lift monitoring cameras 254 may be referred to as "lift video."

In some embodiments, the environmental sensors 250 include one or more environment monitoring cameras 280. The environment monitoring cameras 280 may include one or more video cameras mounted about the crane system 102 to capture video images of FOVs that include environmental ROIs around the crane system 102. The environment monitoring cameras 280 may include one or more perimeter monitoring cameras 282 affixed to the crane system 102 and oriented to capture FOVs of the area surrounding the chassis 202 of the crane system 102. For example, front, back, left and right perimeter monitoring cameras 282 may be oriented to acquire FOVs of the area in front of, in back of, to the left side of and to the right side, respectively, of the chassis 202 of the crane system 102. Each of the FOVs may overlap adjacent FOVs to provide a full view of the environment around the chassis 202 of the crane system 102. For example, the front and back FOVs may overlap the right and left FOVs to provide a 360 degree view of the environment around the chassis 202 of the crane system 102. Video captured by the perimeter monitoring cameras 282 may enable an operator to assess the status of the environment surrounding the crane system 102. Video captured by the perimeter monitoring cameras 282 may be referred to as "perimeter video."

The environment monitoring cameras 280 may include one or more fall-zone cameras 284 oriented to capture a FOV of a fall-zone 289 located below a load 206 (or under the load block 224 when a load is not suspended from the load block 224). A fall-zone camera 284 may be affixed to a central portion of the boom 220 and articulate, such that the FOV can be adjusted to follow the fall-zone 289 as the fall-zone camera 284 and the fall-zone 289 move relative to one another. In some embodiments, the orientation of the fall-zone camera 284 is controlled to remain focused on the fall-zone 289 as the boom angle is varied. For example, the local crane controller 120 may process video images captured by the fall-zone camera 284, or the boom angle, boom direction, or boom length indicated by output of the operational sensors 240 (e.g., by the boom angle, boom direction, and boom length sensors) to determine relative positions of the fall-zone 289 and the fall-zone camera 284 and may control the orientation of the fall-zone camera 284 to focus on the determined position of the fall-zone 289. This may, in effect, cause the FOV of the fall-zone camera 284 to automatically follow the fall-zone 289. In some embodiments, an operator may view video images captured by the fall-zone camera 284 to determine relative positions of the fall-zone 289 and the fall-zone camera 284 and may manually control the orientation of the fall-zone camera 284 to focus on the determined position of the fall-zone 289. This may, in effect, cause the FOV of the fall-zone camera 284 to manually follow the fall-zone 289. Video captured by the fall-zone cameras 284 may enable an operator to assess the status of fall-zone 289, including the presence of personnel or objects in the fall-zone 289. Video captured by the fall-zone cameras 284 may be referred to as "fall-zone video."

In some embodiments, the environmental sensors 250 include one or more environment monitoring proximity sensors 290. The environment monitoring proximity sensors 290 may include one or more proximity sensors mounted about the crane system 102 for monitoring the presence of personnel and other objects in ROIs located around the crane system 102. The environment monitoring proximity sensors 290 may include one or more perimeter proximity sensors 292 affixed to the crane system 102 and oriented to sense the presence of personnel and other objects in the area surrounding the crane system 102. For example, front, back, left and right perimeter proximity sensors 292 may be oriented to sense the presence of personnel and other objects in the ROIs corresponding to the areas in front, in back, to the left and to the right, respectively, of the chassis 202 of the crane system 102. Each of the ROIs may overlap adjacent ROIs to provide full coverage of the area around the chassis 202 of the crane system 102. For example, the front and back ROIs may overlap the right and left ROIs to provide 360 degree coverage of the area around the chassis 202 of the crane system 102.

The environment monitoring proximity sensors 290 may include a fall-zone proximity sensor 294. The fall-zone proximity sensor 294 may be affixed to the crane system 102 and oriented to sense the presence of personnel and other objects in the fall-zone 289. In some embodiments, the fall-zone proximity sensor 294 includes one or more proximity sensors affixed to a front portion of the lifting system that faces in the direction of the fall-zone 289. For example, the fall-zone proximity sensor 294 may be affixed to an exterior of a front of the operating cabin 230. Such a mounting position may facilitate the fall-zone proximity sensor 294 continuously monitoring a region located in front of the cabin, including the fall-zone 289, as the lifting system 204 (e.g., including the operating cabin 230, the boom 220, and the load block 224) is rotated left or right.

Figure 3:
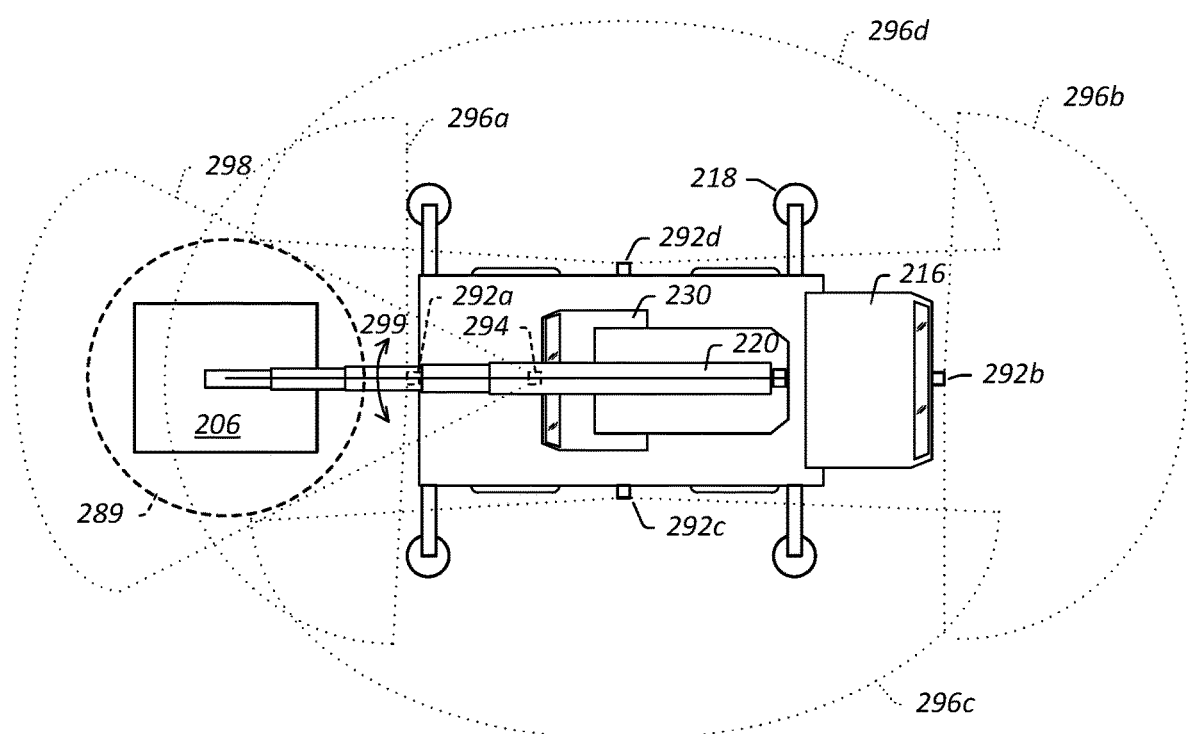
FIG. 3 is a diagram that illustrates locations and coverage of environment monitoring proximity sensors in accordance with one or more embodiments.

FIG. 3 is a diagram that illustrates a top-view of the crane system 102 and locations and coverage of environment monitoring proximity sensors 290, in accordance with one or more embodiments. In the illustrated embodiment, the environment monitoring proximity sensors 290 include front, back, left and right perimeter proximity sensors 292a, 292b, 292c and 292d oriented to sense the presence of personnel and other objects in front, back, left and right ROIs 296a, 296b, 296c and 296d, respectively, corresponding to the areas in front, in back, to the left and to the right, respectively, of the crane system 102. Each of the ROIs 296a, 296b, 296c and 296d may overlap adjacent ones of the ROIs to provide a full coverage of the area around the crane system 102. For example, the front and back ROIs 296a and 296b may each overlap portions of the right and left ROIs 296c and 296d to provide 360 degree coverage of the area around the crane system 102. In the illustrated embodiment, the environment monitoring proximity sensors 290 further include a fall-zone proximity sensor 294 affixed to a front portion of the lifting system and oriented to sense the presence of personnel and other objects in a lift zone ROI 298 that encompasses the fall-zone 289. Such a mounting position may facilitate the fall-zone proximity sensor 294 continuously monitoring the region in-front of the cabin, including the fall-zone 289, as the lifting system 204 (e.g., including the operating cabin 230, the boom 220, and the load block 224) is rotated left or right (as illustrated by arrow 299).

In some embodiments, the environment monitoring proximity sensors 290 include ranging sensors. For example, each of the perimeter proximity sensors 292 and the fall-zone proximity sensor 294 may include one or more light detection and ranging (lidar) sensors. A lidar sensor may measure distance to a target by illuminating the target with pulsed laser light and measuring the reflected pulses with a sensor. Differences in laser return times and wavelengths can be used to make digital 3-D representations (or "mappings") of the target. In some embodiments, the environment monitoring proximity sensors 290 are employed to generate mappings of ROIs located around the crane system 102. The mappings can be used to determine whether prohibited objects, such as personnel, are located in ROIs around the crane system 102. The mappings may be provided in the crane operational data 110. In response to determining that a prohibited object is located in a ROI, measures can be undertaken to address the presence of the prohibited object in the ROI. For example, in response to determining that a person is located in the fall-zone 289 or another ROI, a corresponding alert may be provided to the crane operator or operation of the crane system 102 may be inhibited. This can include, for example, presenting an alert indicating that a prohibited object has been detected in a ROI (e.g., a person is located in the fall-zone 289) to an operator and suspending operation of the lifting system 204 until it is determined that the prohibited object is no longer in the ROI (e.g., the person has left the fall-zone 289) or that an operator has overridden the alert (e.g., the operator has acknowledged that the person is located in the fall-zone 289 and has selected to continue or resume uninhibited operation of the crane system 102).

Figure 4:
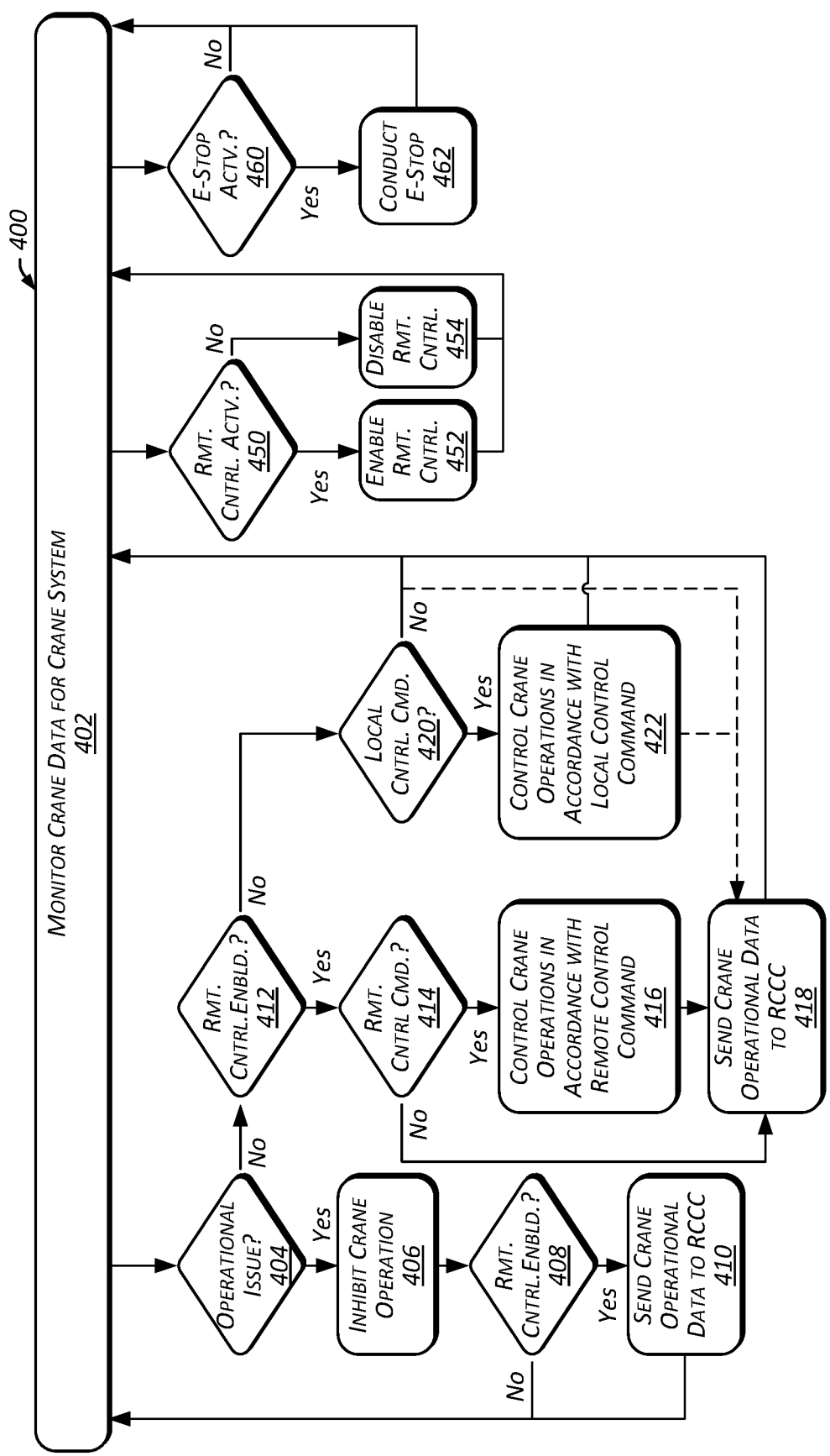
FIG. 4 is a block diagram that illustrates a method of operating of a remote controlled crane system in accordance with one or more embodiments.

FIG. 4 is a block diagram that illustrates a method 400 of operating of a remote controlled crane system in accordance with one or more embodiments. Some or all of the operations of method 400 may be performed by a local crane controller of a remotely controlled crane system. For example, method some or all of the operations of method 400 may be performed by the local crane controller 120 of the crane system 102. In some embodiments, the local crane controller 120 includes a computer system that is the same or similar to computer system 1000 described with regard to FIG. 6.

Method 400 may include determining a remote control activation state of the local crane system (block 450). In some embodiments, determining a remote control activation state of the local crane system includes determining whether a local remote crane control activation system ("local RCCAS") of the local crane system is set to an active state or an inactive state. For example, determining whether remote control of the crane system 102 by a RCCC is enabled may include the local crane controller 120 determining whether a "remote enable" switch of the local RCCAS 134 is set to an active position (or inactive position) and determining that remote control of the crane system 102 is enabled in response to determining that "remote enable" switch of the local RCCAS 134 is set to an active position and determining that remote control of the crane system 102 is disabled in response to determining that "remote enable" switch of the local RCCAS 134 is set to an inactive position (or in response to not being able to determine the state of the "remote enable" switch).

Method 400 may include, in response to determining that the remote control activation of the local crane system is in an active state, enabling remote control of the local crane system (block 452). Enabling remote control of the local crane system may include enabling or otherwise facilitating the receipt and processing of remote control commands received by the crane system. For example, enabling remote control of the crane system 102 may include the local crane controller 120 controlling the channel of the network interface 126 on which the crane remote control data 112 is received such that the crane remote control data 112 can be received and processed by the local crane controller 120.

Method 400 may include, in response to determining that the remote control activation of the local crane system is in an inactive state, disabling remote control of the local crane system (block 454). Disabling remote control of the local crane system may include disabling or otherwise inhibiting the receipt or processing of remote control commands received by the crane system. For example, disabling remote control of the crane system 102 may include the local crane controller 120 controlling the channel(s) of the network interface 126 on which the crane remote control data 112 is received such that the crane remote control data 112 is not received or the local crane controller 120 otherwise not processing the crane remote control data 112 received. As a result, remote commands of the data 112 may not be executed by the crane system 102. In some embodiments, disabling remote control of the crane system 102 includes disabling receipt or processing of remote control commands, including remote control commands embedded in crane remote control data received from a RCCC. For example, disabling remote control of the local crane system may include the crane controller 120 disabling a channel of the network interface 126 on which the crane remote control data 112 is received, or powering down a processor tasked with processing the incoming crane remote control data 112, to effectively "block" receipt or processing of remote control commands embedded in crane remote control data 112 received from the RCCC 104. As a result the crane controller 120 may not effectively receive remote control commands sent from the RCCC 104 or execute operational control of the crane system 102 based on the remote control commands sent from the RCCC 104.

In some embodiments, the state of the local RCCAS 134 and thus, the state of remote control of the crane system 102 by a RCCC, is recorded for reference in other operations. For example, the local crane controller 120 may record the state of the local RCCAS 134 in a "remote enable" status bit stored in memory of the RCCC 104 for reference in other operations, including determining whether remote control of the crane system 102 by a RCCC is enabled or disabled. In some embodiments, enabling remote control of the local crane system includes setting a corresponding status for reference. For example, enabling remote control of the crane system 102 by a RCCC may include the local crane controller 120 ensuring that the "remote enable" status bit stored in memory of the crane system 102 is set (e.g., to "1") to reflect the "enabled" state of remote control of the crane system 102 by a RCCC to facilitate the receipt, processing and execution of remote control commands received by the crane system 102. In some embodiments, disabling remote control of the local crane system includes setting a corresponding status for reference. For example, disabling remote control of the crane system 102 by a RCCC may include the local crane controller 120 ensuring that the "remote enable" status bit stored in memory of the crane system 102 is set (e.g., to "0") to reflect the "disabled" state of remote control of the crane system 102 by a RCCC to inhibit the receipt, processing or execution of remote control commands received by the crane system 102.

Method 400 may include monitoring crane data for a crane system (block 402). In some embodiments, monitoring crane data for a crane system includes monitoring data regarding various operational and environmental characteristics of the crane system sensed by a sensing system of the crane system or control commands received by way of local or remote controls of the crane system. For example, monitoring crane data for the crane system 102 may include the local crane controller 120 monitoring crane sensor data acquired by way of the local crane sensing system 122 and monitoring crane control data corresponding to operator manipulation of the local crane controls 132 or the remote crane controls 152. The crane sensor data for the crane system 102 may include, for example, data that is indicative of a boom direction, a boom angle, a boom length, a boom radius, a load block height, a load weight, an outrigger status, a hydraulic fluid pressure, an engine temperature, an engine oil pressure, an engine voltage, a fuel level, video of the crane system 102 or jobsite, or the presence of persons or objects near the crane system 102 (e.g., the presence of persons or objects in a region of interest, such as the fall-zone). The crane control data for the crane system 102 may include, for example, local control commands provided in response to a local operator manipulating the local crane controls 132 in the operating cabin 230 or remote control commands provided in crane remote control data 112 in response to a remote operator manipulating the remote crane controls 152 at the RCCC 104.

Method 400 may include determining whether an operational issue for the crane system is present (block 404). In some embodiments, determining whether an operational issue for the crane system is present includes determining, based on the crane data for the crane system, whether an operational issue that requires inhibiting of the operation of the crane is present. Operational issues that require inhibiting of the operation of the crane may include, for example, a mechanical failure of components of the crane system (e.g., a failure of the boom to extend/retract), a failure of a safety system of the crane system (e.g., a failure of one or more of the environmental sensors), or a safety issue (e.g., detection of a prohibited object in a region of interest, such as the fall-zone of the crane system, or the loss of communication between the crane system and the RCCC). For example, determining whether an operational issue for the crane system 102 is present may include the local crane controller 120 determining, based on the monitoring of the crane data, whether an operational issue that requires inhibiting of the operation of the crane system 102 is present. The local crane controller 120 may, for example, determine that an operational issue that requires inhibiting of the operation of the crane system 102 is present in response to determining that a person or other prohibited object is located in the fall-zone 289 based on a mapping of the area around the crane system generated from data provided by way of the environment monitoring proximity sensors 290, including data provided by the fall-zone proximity sensor 294 or the perimeter proximity sensors 292.

Method 400 may include, in response to determining that an operational issue for the crane system is present, inhibiting crane operation (block 406). Inhibiting crane operation may include inhibiting certain crane operations to facilitate resolution of the operational issue and to prevent safety incidents that may occur as a result of the issue. For example, in response to determining that a person or other prohibited object is located in the fall-zone 289, the local crane controller 120 may inhibit operations of the lifting system 204 of the crane system 102 (e.g., inhibit operation of the boom 220 and the winch 228) in an effort to stabilize the load block 224 and a load 206 suspended from the load block 224 to reduce a risk of injury to the person or object located in the fall-zone 289. In some embodiments, an indication of the operational issue and the crane operations that are inhibited as a result of the operational issue may be presented by way of a local crane operations dashboard. For example, the local crane controller 120 may control the local crane operations dashboard 130 to indicate that a person or other prohibited object is located in the fall-zone 289 and to indicate that operation of the boom 220 and the winch 228 is inhibited. This may provide a local operator with an opportunity to investigate and resolve the operational issue locally. In some embodiments, an option to override the indication of the operational issue may be presented. For example, the local crane controller 120 may control the local crane operations dashboard 130 to display, or otherwise present, a button for overriding the reported issue. This may provide a local operator with an opportunity to investigate the operational issue locally (e.g., by direct visual and audible assessment of the jobsite, the area around the crane system 102 and the crane system 102 from inside or outside of the operating cabin 230, or by an assessment of operational and environmental characteristics of the crane system 102 presented by way of the local crane operator interface 124), and to restore uninhibited operation of the crane system 102 in the event the operator determines that the reported operational issue is not present, or that uninhibited operation of the crane system 102 is required to resolve the reported operational issue.

Method 400 may further include, in response to determining that an operational issue for the crane system has occurred, determining whether remote control of the crane system by a RCCC is enabled (block 408). In some embodiments, determining whether remote control of the crane system by a RCCC is enabled includes determining a current status based on the status setting operations at blocks 450-454. For example, determining whether remote control of the crane system 102 by a RCCC is enabled may include the local crane controller 120 polling the "remote enable" status bit stored in memory of the crane system 102 to determine whether it corresponds to an enabled state (e.g., "1") or disabled state (e.g., "0"), and determining that remote control of the crane system 102 by a RCCC is enabled in response to determining that the "remote enable" status bit stored in memory of the crane system 102 corresponds to an enabled state, or determining that remote control of the crane system 102 by a RCCC is disabled in response to determining that the "remote enable" status bit stored in memory of the crane system 102 corresponds to a disabled state.

In some embodiments, determining whether remote control of the crane system by a RCCC is enabled includes determining whether a RCCC is currently monitoring or controlling operations of the crane system. For example, determining whether remote control of the crane system 102 by a RCCC is enabled may include the local crane controller 120 determining whether the RCCC 104 is currently monitoring or controlling operations of the crane system 102. Such an indication may be provided to the local crane controller 120 in the crane remote control data 112 provided by the RCCC 104.

Method 400 may include, in response to determining that remote control of the crane system is enabled, proceeding to send crane operational data to the RCCC (block 410). In some embodiments, the crane operational data includes an indication of the reported operational issue and the crane operations that are inhibited as result of the reported operational issue. For example, the local crane controller 120 may send, to the RCCC 104 by way of the network interface 126 and the network 106, crane operational data 110 that includes an indication that a person or other prohibited object is located in the fall-zone 289 and that operation of the boom 220 and the winch 228 is inhibited. In some embodiments, the RCCC 104 may present corresponding data by way of a remote crane operator interface. For example, the RCCC 104 may control the remote crane operations dashboard 150 to indicate that a person or other prohibited object is located in the fall-zone 289 and to indicate that operation of the boom 220 and the winch 228 of the crane system 102 is inhibited. This may provide a remote operator located at the RCCC 104 with an opportunity to investigate and resolve the operational issue and to restore uninhibited operation of the crane system 102. As described, in some embodiments, an option to remotely override the indication of the operational issue may be presented. For example, the RCCC 104 may control the remote crane operations dashboard 150 to present an option to override of the reported issue. This may provide a remote operator with an opportunity to remotely investigate the operational issue (e.g., by reviewing video feeds of the crane system 102, lidar mappings of the area around the crane system 102 or other operational and environmental characteristics of the crane system 102 presented by way of the remote crane operator interface 140) and to restore uninhibited operation of the crane system 102 (e.g., by selection of the override) in the event the remote operator determines that the reported operational issue is not present or that uninhibited operation of the crane system 102 is required to resolve the reported operational issue.

Method 400 may include, in response to determining that an operational issue for the crane system is not present, proceeding to determine whether remote control of the crane system by a RCCC is enabled (block 412). This may be accomplished in a manner similar to that described with regard to block 408.

Method 400 may include, in response to determining that remote control of the crane system is enabled, proceeding to determine whether a remote control command has been received (block 414). In some embodiments, remote control commands are provided in response to a remote operator manipulating remote crane controls. For example, remote control commands may include commands to control the boom 220, the winch 228 or other operational aspects of the crane system 102, generated in response to a remote operator manipulating the remote crane controls 152 at the RCCC 104. In some embodiments, the crane operational data includes an indication of the remote control commands. For example, in response to a remote operator manipulating the remote crane controls 152 at the RCCC 104 to extend and rotate the boom 220 and to unspool load line from the winch 228, the RCCC 104 may send to the local crane controller 120 by way of the network interface 126, crane remote control data 112 that includes remote control commands to extend and rotate the boom 220 and to unspool load line from the winch 228.

Method 400 may include, in response to determining that a remote control command has been received, proceeding to controlling crane operations in accordance with the remote control command (block 416). In some embodiments, this includes controlling one or more elements of the crane system to execute the remote control command. For example, in response to the local crane controller 120 receiving crane remote control data 112 that includes remote control commands to extend and rotate the boom 220 and unspool load line 222 from the winch 228, the local crane controller 120 may control extension cylinders in the boom 220 to extend the boom 220, control the lifting system 204 to rotate the boom 220 and control the winch to unspool load line 222 from the winch 228.

Method 400 may include, in response to determining that a remote control command has not been received (or following controlling of crane operations in accordance with the remote control command), proceeding to sending crane operational data to the RCCC (block 418). In some embodiments, the crane operational data includes an indication of the current state of the crane system. For example, after initiating execution of a control command, the local crane controller 120 may send to the RCCC 104, by way of the network interface 126 and the network 106, crane operational data 110 that includes an indication of the current state of the crane system 102, including the extension and rotation of the boom 220 and the unspooling of load line 22 from the winch 228. In such an embodiment, the crane operational data 110 may be continually provided to the RCCC 104 regardless of whether a control command is received or executed to facilitate continuous monitoring of the crane system 102 by a remote operator located at the RCCC 104.

Method 400 may include, in response to determining that remote control of the crane system is not enabled, proceeding to determine whether a local control command has been received (block 420). Determining whether a local control command has been received may include determining whether local control commands are provided in response to a local operator manipulating local crane controls of the crane system. For example, this may include the local crane controller 120 determining that a local control command has been received in response to receiving signals from local crane controls 132 indicative of operational commands. These may include, for example, commands to control the boom 220, the winch 228 or other operational aspects of the crane system 102, generated in response to a local operator manipulating the local crane controls 132 at the crane system 102.

Method 400 may include, in response to determining that a local control command has been received, proceeding to controlling crane operations in accordance with the local control command (block 422). In some embodiments, this includes controlling one or more elements of the crane system to execute the local control command. For example, in response to the local crane controller 120 receiving a local command to extend and rotate the boom 220 and unspool load line 222 from the winch 228, the local crane controller 120 may control extension cylinders in the boom 220 to extend the boom 220, control the lifting system 204 to rotate the boom 220, and control the winch to unspool load line 222 from the winch 228.

Method 400 may include, in response to determining that a local control command has not been received, or following controlling of crane operations in accordance with the remote control command, proceeding to monitoring crane data for a crane system (block 402). In some embodiments, even during periods of local control (e.g., while remote control is not enabled), crane operational data may be sent to the RCCC (as illustrated by the dashed lines of FIG. 4 extending to block 418). This may enable remote monitoring of the crane system at the RCCC during periods of remote or local control. For example, during a period of local control, the local crane controller 120 may send to the RCCC 104 by way of the network interface 126 and the network 106, crane operational data 110 that includes an indication of state of the crane system 102. In such an embodiment, the crane operational data 110 may be continually provided to the RCCC 104 regardless of whether the crane system 102 is under local or remote control to facilitate continuous monitoring of the crane system 102 by a remote operator located at the RCCC 104. Further, a remote operator located at the RCCC 104 may have an option to select to enable remote control of the crane system 102 based on the monitoring. In such an embodiment, a remote operator may have the ability to enact remote control on an as-needed basis. This may be advantageous where local and remote operators are needed for different tasks at a jobsite. For example, an operator may enable remote operation when basic lifting tasks (or issues) that do not require an on-site operator are encountered, and an operator may disable remote operation when more complex lifting tasks (or issues) that require an on-site operator are encountered.

Method 400 may include determining whether an emergency stop state is active (block 460). In some embodiments, determining whether an emergency stop state is active includes determining whether a local emergency stop control or a remote local emergency stop control is active. For example, determining whether an emergency stop state is active may include the local crane controller 120 determining whether a local emergency stop control ("local e-stop control") 133 of the local crane controls 132 is set to an active position or whether a remote e-stop command has been received (e.g., from the RCCC 104), and determining that emergency stop is active in response to determining that local emergency stop control ("local e-stop control") 133 is set to an active position or a remote e-stop command has been received, or determining that emergency stop is inactive in response to determining that local emergency stop control ("local e-stop control") 133 is set to an inactive position and a remote e-stop command has not been received.

Method 400 may include, in response to determining that an emergency stop state is active, conducting an emergency stop ("e-stop") procedure (block 462). As described, an e-stop procedure may include the local crane controller 120 placing components of the crane system 102 into a fail-safe state and providing corresponding alerts. The e-stop procedure may, for example, include elements that are similar to those following detection of an operational issue (e.g., as described at blocks 404-410). Method 400 may include, in response to determining that an emergency stop state is not active, proceeding to monitoring crane data for the crane system (block 402).

Figure 5:
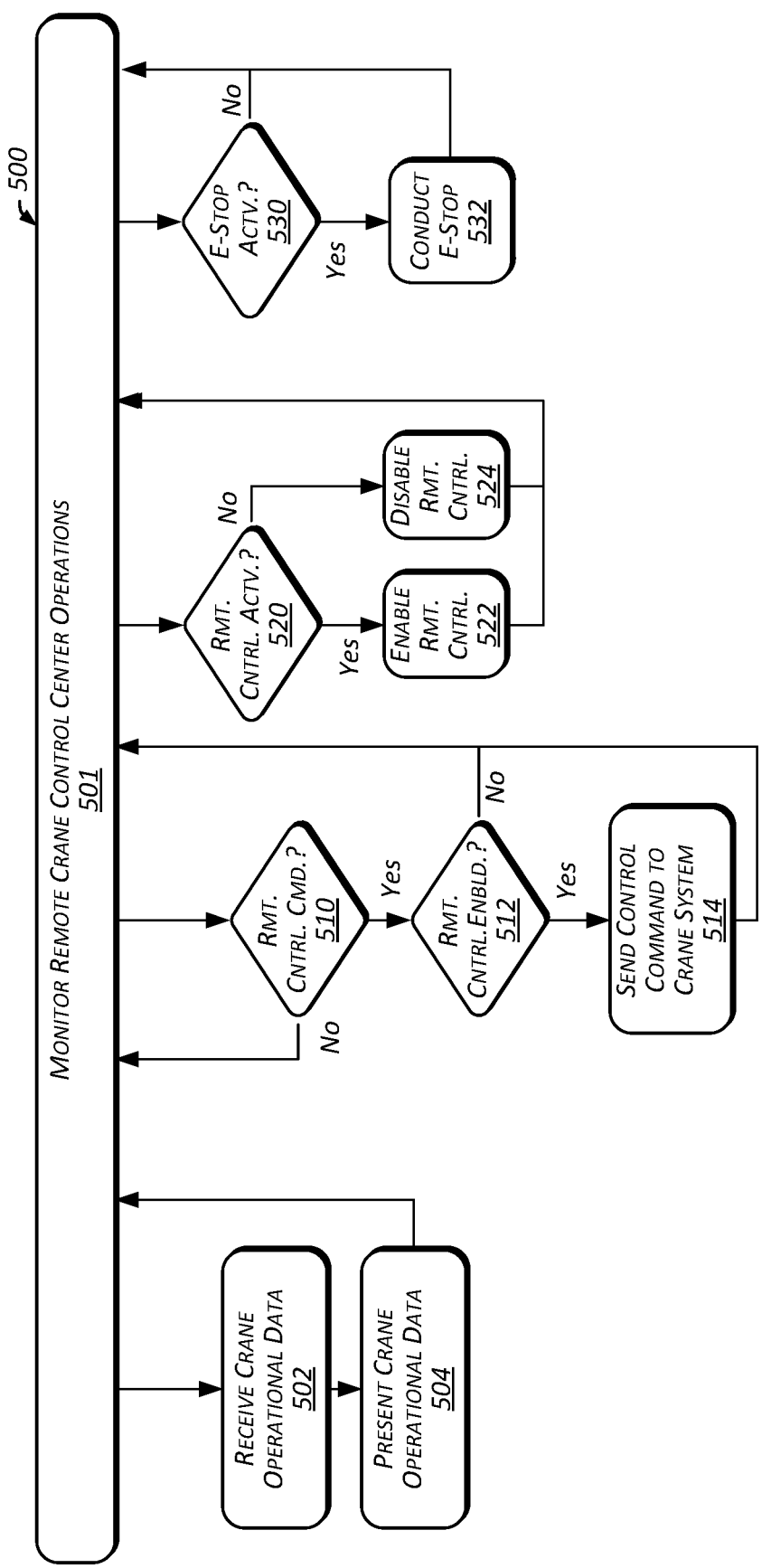
FIG. 5 is a block diagram that illustrates a method of operating a remote crane control center in accordance with one or more embodiments.

FIG. 5 is a block diagram that illustrates a method 500 of operating a RCCC in accordance with one or more embodiments. Some or all of the operations of method 500 may be performed by a controller of a RCCC. For example, some or all of the operations of method 500 may be performed by the RCC 144 of the RCCC 104. In some embodiments, the RCCC 104 includes a computer system that is the same or similar to computer system 1000 described with regard to FIG. 6.

Method 500 may include determining a remote control activation state of the remote crane system (block 520). In some embodiments, determining a remote control activation state of the remote crane system includes determining whether a remote crane control activation system ("remote RCCAS") of the remote crane system is set to an active state or an inactive state. For example, determining whether remote control of the crane system 102 by the RCCC 104 is enabled may include the RCC 144 determining whether a "remote enable" switch of the remote RCCAS 156 is set to an active position (or inactive position), and determining that the remote RCCAS 156 is activated and, in turn, that remote control of the crane system 102 by the RCCC 104 is enabled, in response to determining that "remote enable" switch of the remote RCCAS 156 is set to an active position, or determining that the remote RCCAS 156 is deactivated and, in turn, that remote control of the crane system 102 by the RCCC 104 is disabled, in response to determining that "remote enable" switch of the remote RCCAS 156 is set to an inactive position (or in response to not being able to determine the state of the "remote enable" switch). In some embodiments, determining that the remote RCCAS 156 is set to an active position may include determining that a required access control device 172, such as a physical key, RFID tag, or similar item, is employed, as described herein. For example, where a physical key or approved RFID tag is employed as required, the RCC 144 may determine that the remote RCCAS 156 is set to an active state and, in turn, that remote control of the crane system 102 by the RCCC 104 is enabled regardless of the state of a "remote enable" switch. Where a physical key or approved RFID tag is not employed as required, the RCC 144 may determine that the remote RCCAS 156 is set to an inactive state and, in turn, that remote control of the crane system 102 by the RCCC 104 is disable regardless of the state of a "remote enable" switch.

In some embodiments, the state of the remote RCCAS 156 (and thus the state of remote control of the crane system 102 by the RCCC 104) is recorded for reference in other operations. For example, the RCC 144 may record the state of the remote RCCAS 156 in a "remote enable" status bit stored in memory of the RCCC 104 for reference in other operations, including determining whether remote control of the crane system 102 by the RCCC 104 is enabled or disabled. This may include the RCC 144 setting the "remote enable" status bit stored in memory of the RCCC 104 to "0" in response to determining that the remote RCCAS 156 is inactive, and the RCC 144 setting the "remote enable" status bit stored in memory of the RCCC 104 to "1" in response to determining that the remote RCCAS 156 is active.

Method 500 may include, in response to determining that the remote control activation of the remote crane system is in an active state, enabling remote control of the local crane system by the RCCC (block 522). Enabling remote control of the local crane system by the RCCC may include enabling or otherwise facilitating the transmission of remote control commands received by way of the RCCC to the local crane system. For example, enabling remote control of the crane system 102 by the RCCC 104 may include the RCC 144 ensuring that the "remote enable" status bit stored in memory of the RCCC 104 is set (e.g., to "1") to reflect the active state of the remote RCCAS 156 (and the "enabled" state of remote control of the crane system 102 by the RCCC 104) to facilitate the transmission of remote control commands received by way of the remote crane controls 152 of the RCCC 104 to the crane system 102.

Method 500 may include, in response to determining that the remote control activation of the remote crane system is in an inactive state, disabling remote control of the local crane system by the RCCC (block 524). Disabling remote control of the local crane system by the RCCC may include enabling or otherwise facilitating the transmission of remote control commands received by way of the RCCC to the local crane system. For example, disabling remote control of the crane system 102 by the RCCC 104 may include the RCC 144 ensuring that the "remote enable" status bit stored in memory of the RCCC 104 is set (e.g., to "0") to reflect the inactive state of the remote RCCAS 156 (and the "disabled" state of remote control of the crane system 102 by the RCCC 104) to inhibit the transmission of remote control commands received by way of the remote crane controls 152 of the RCCC 104 to the crane system 102.

Method 500 may include receiving crane operational data (block 502). This may include, for example, the RCC 144 receiving, from the crane system 102 by way of the network 106 and the network interface 142, crane operational data 110. As described, the crane operational data 110 may include data regarding operation of the crane system 102, such as crane operating parameters (e.g., boom direction, boom angle, boom length, boom radius, load block height, load weight, outrigger status, hydraulic fluid pressure, engine temperature, engine oil pressure, engine voltage and fuel level) or crane environment data (e.g., video, audio or proximity data indicative of the status of the environment around the crane system 102). In some embodiments, the crane operational data includes an indication of a reported operational issue and crane operations that are inhibited as result of the reported operational issue. For example, the crane operational data 110 may include an indication that a person or other prohibited object is located in the fall-zone 289 and that operation of the boom 220 and the winch 228 is inhibited.

Method 500 may include presenting crane operational data (block 504). Presenting crane operational data may include presenting some or all of the crane operational data by way of a remote crane operator interface 140. For example, presenting crane operational data may include the RCC 144 presenting some or all of the crane operational data 110 by way of the remote crane operations dashboard 150, as described here. In some embodiments, presenting the crane operational data includes presenting an indication of a reported operational issue and crane operations that are inhibited as result of the reported operational issue. For example, the RCC 144 may control the remote crane operations dashboard 150 to indicate that a person or other prohibited object is located in the fall-zone 289 and to indicate that operation of the boom 220 and the winch 228 is inhibited. This may provide a remote operator with an opportunity to investigate and resolve the operational issue and to restore uninhibited operation of the crane system 102.

In some embodiments, an option to remotely override the indication of the operational issue is presented. For example, the RCC 144 may control the remote crane operations dashboard 150 to display, or otherwise present, a button for overriding the reported issue. This may provide a remote operator with an opportunity to investigate the operational issue remotely (e.g., by an in-direct assessment operational and environmental characteristics of the crane system 102 presented by way of the remote crane operations dashboard 150) and to restore uninhibited operation of the crane system 102 in the event the remote operator determines that the reported operational issue is not present or that uninhibited operation of the crane system 102 is required to resolve the reported operational issue.

In some embodiments, a remote crane operations dashboard displays external cabin view video, internal cabin view video, lift system video, lift video, perimeter video, fall-zone video, or lidar mappings of the area around the crane system 102, including the fall-zone 289 or the front, back, left or right ROIs 296*a*, 296*b*, 296*c* or 296*d*. In some embodiments, the information to be presented by way of the remote crane operations dashboard is user selectable. In such an embodiment, a remote operator can select the information to be presented by way of the remote crane operations dashboard to quickly and accurately assess the validity of the reported issue and, if needed, steps to alleviate to reported issue. For example, in response to the RCC 144 controlling the remote crane operations dashboard 150 to indicate that a person or other prohibited object is located in the fall-zone 289 and to indicate that operation of the boom 220 and the winch 228 is inhibited, the remote operator may select to view the fall-zone video and a lidar mapping of the fall-zone 289 at the remote crane operations dashboard 150 for use in determining whether a person or other prohibited object is actually located in the fall-zone 289 and determining whether operation of the boom 220 and the winch 228 should remain inhibited or be re-enabled. In response to determining that a person or other prohibited object is not located in the fall-zone 289 or that operation of the boom 220 and the winch 228 should be enabled, the remote operator may proceed to select the displayed button for overriding the reported issue. This may re-enable operation of the boom 220 and the winch 228. As described, an indication of the override or corresponding control commands may be forwarded to the crane system 102 by way of the crane remote control data 112. In some embodiments, the crane controller 120 may re-enable operation of the boom 220 and the winch 228 in response to receiving the indication of the override or the corresponding control commands.

Method 500 may include determining whether a remote control command has been generated (block 510). In some embodiments, determining whether a remote control command has been generated includes determining whether a remote operator has manipulated remote crane controls to impart remote control of the crane system. For example, the RCC 144 may determine that a remote control command has been generated in response to receiving control signals from the remote controls 152 at the RCCC 104 that are generated in response to a remote operator manipulating the remote crane controls 152 to extend the boom 220, rotate the boom 220, and to unspool load line 222 from the winch 228.

Method 500 may include, in response to determining that a remote control command has been generated, proceeding to determine whether remote control of the remote crane system by the RCCC is enabled (block 512). In some embodiments, determining whether remote control of the remote crane system by the RCCC is enabled includes determining a current status based on the status setting operations at blocks 520-524. For example, determining whether remote control of the crane system 102 by the RCCC 104 is enabled may include the RCC 144 polling the "remote enable" status bit stored in memory of the RCCC 104 to determine whether it corresponds to an enabled state (e.g., "1") or disabled state (e.g., "0"), and determining that remote control of the crane system 102 by the RCCC 104 is enabled in response to determining that the "remote enable" status bit stored in memory of the RCCC 104 corresponds to an enabled state, or determining that remote control of the crane system 102 by the RCCC 104 is disabled in response to determining that the "remote enable" status bit stored in memory of the RCCC 104 corresponds to a disabled state.

Method 500 may include, in response to determining that remote control of the remote crane system by the RCCC is enabled, proceeding to sending crane control data to the crane system (block 514). In some embodiments, sending crane control data to the crane system includes generating crane control data corresponding to the remote control command(s) and sending the crane control data to the crane system. For example, in response to the RCC 144 determining that a remote control command has been generated in response to receiving control signals from the remote controls 152 at the RCCC 104 that are generated in response to a remote operator manipulating the remote crane controls 152 at the RCCC 104 to extend the boom 220, the RCC 144 may process the signals and generate corresponding crane remote control data 112 that includes a corresponding remote control command to extend the boom 220, and send the crane remote control data 112 to the crane system 102 by way of the network interface 142 and the network 106. As described, if remote control of the crane system 102 by a RCCC is enabled (e.g., the local RCCAS 134 is activated), in response to receiving the crane remote control data 112, including the command to extend the boom 220, the local crane controller 120 may identify (e.g., extract) the command from the crane remote control data 112 and execute the remote control command, including controlling one or more elements of the crane system 102 to extend the boom 220. As a further example, if remote control of the crane system 102 by a RCCC is disabled (e.g., the local RCCAS 134 is inactive), the local crane controller 120 may not receive or process the crane remote control data 112 and, in turn, not execute the remote control command. Method 500 may include, in response to determining that a remote control command has not been generated (block 510), determining that remote control of the remote crane system by the RCCC is disabled (block 512), or following sending of the control data to the crane system (block 514), proceeding to monitor the RCCC operations (block 501). In such an embodiment, the crane operational data 110 may be continually provided to the RCCC 104 to facilitate continuous monitoring or control of the crane system 102 by a remote operator located at the RCCC 104.

Method 500 may include determining whether an emergency stop state is active (block 530). In some embodiments, determining whether an emergency stop state is active includes determining whether a remote emergency stop control is active. For example, determining whether an emergency stop state is active may include the remote crane controller 144 determining whether the remote emergency stop control ("remote e-stop control") 153 of the remote crane controls 152 is set to an active position, and determining that an emergency stop is active in response to determining that remote e-stop control 153 is set to an active position, or determining that an emergency stop is inactive in response to determining that remote e-stop control 153 is set to an inactive position.

Method 500 may include, in response to determining that an emergency stop state is active, conducting an emergency stop ("e-stop") procedure (block 532). As described, an e-stop procedure may include the remote crane controller 144 controlling the RCCC 104 to send, to the RCCS 102 by way of the network 106, a remote e-stop command that is intended to command the RCCS 102 to invoke an emergency stop ("e-stop") procedure. In response to receipt of the remote e-stop command, the local crane controller 120 may invoke an emergency stop ("e-stop") procedure, as describe here (see, e.g., block 462). Method 500 may include, in response to determining that an emergency stop state is not active, proceeding to monitor the RCCC operations (block 501).

Figure 6:
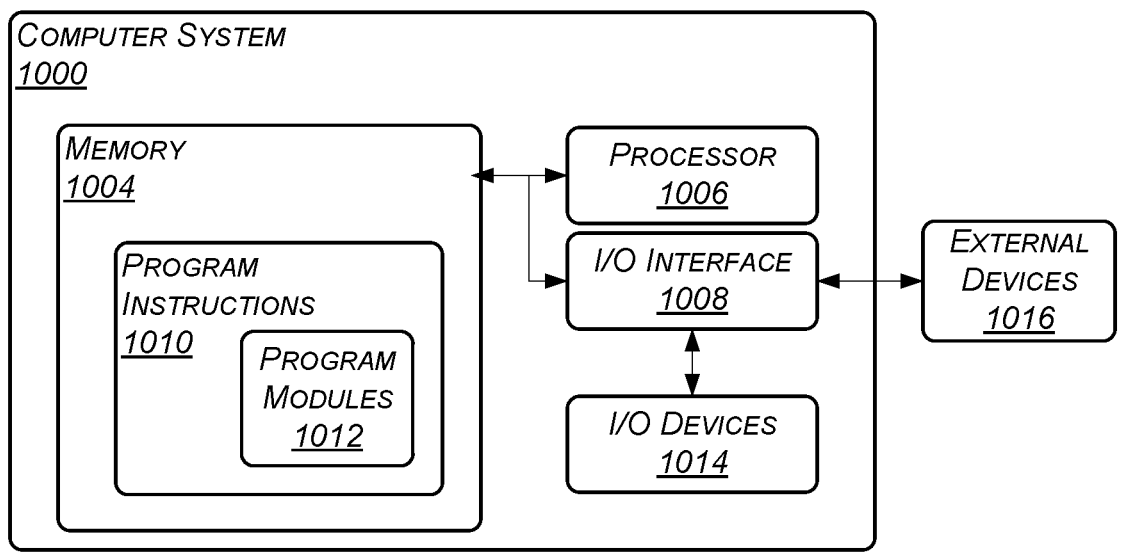
FIG. 6 is a diagram that illustrates an example computer system in accordance with one or more embodiments.

FIG. 6 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a processor (e.g., the processor 1006) to cause the functional operations described, such as those described with regard to operation of the local crane controller 120, the RCCC 104, the method 400 or the method 500.

The processor 1006 may be any suitable processor capable of executing program instructions. The processor 1006 may include a central processing unit (CPU) that carries out program instructions (e.g., the program instructions of the program modules 1012) to perform the arithmetical, logical, or I/O operations described. The processor 1006 may include one or more processors. The I/O interface 1008 may provide an interface for communication with one or more I/O devices 1014, such as a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, such as motors, sensors, displays, controls (e.g., joystick(s), switches, pedals, etc.), other computers, or networks.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted or modified. Portions of the processes and methods may be implemented in software or hardware, or a combination thereof. For example, some or all of the portions of the processes and methods may be implemented by a computer system.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless the content clearly indicates otherwise. That is, a description of an element including A or B may refer to the element including one or both of A and B. As used throughout this application, the phrase "based on" does not limit the associated operation to being solely based on a particular item, unless the content clearly indicates otherwise. Thus, for example, processing "based on" data A may include processing based at least in part on data A and based at least in part on data B. As used throughout this application, the term "from" does not limit the associated operation to being directly from, unless the content clearly indicates otherwise. Thus, for example, receiving an item "from" an entity may include receiving an item directly from the entity or indirectly from the entity (e.g., by way of an intermediary entity). Ranges may be expressed in the disclosure as from about one particular value, to about another particular value, or both. When such a range is expressed, it is to be understood that another embodiment is from the one particular value, to the other particular value, or both, along with all combinations within said range. Thus, for example, the range of "about 1 to about 2", may refer to a range of 1 to 2. Unless specifically stated otherwise, as apparent from the discussion, it is appreciated that throughout this specification discussions utilizing terms such as "processing," "computing," "calculating," "determining" or the like refer to actions or processes of a specific apparatus, such as a computer or a similar special purpose electronic processing/computing device.

What is claimed is:

1. A remote crane system comprising:
a communication network;
a remote controlled crane system configured to be located at a jobsite, the remote controlled crane system comprising:
 a lifting system configured to lift a load;
 local crane controls configured to be manipulated by a local crane operator to control operation of the remote controlled crane system;
 a local activation system comprising a remote activation switch configured to selectively enable or disable remote control of the remote controlled crane system, wherein selectively enable or disable remote control of the remote controlled crane system comprises respectively activating or deactivating a channel of a network interface of the remote controlled crane system; and
 a crane controller configured to:
  receive, from the local crane controls, local control commands and operate the remote controlled crane system based on the local control commands; and
  receive, from a remote crane control center (RCCC) by way of the communication network, remote control commands, and operate the remote controlled crane system based on the remote control commands; and the remote crane control center (RCCC) comprising:
a remote crane controller (RCC);
remote crane controls configured to be manipulated by a remote crane operator to control operation of the remote controlled crane system; and
a remote crane control activation system configured to be (a) activated to enable control of the remote controlled crane system by way of the remote crane controls, and (b) deactivated to disable control of the remote controlled crane system by way of the remote crane controls, wherein the remote crane control activation system comprises a remote state control configured to be (a) set to a first state configured to activate the remote crane control activation system and (b) set to a second state configured to deactivate the remote crane control activation system, wherein the remote state control comprises a switch,
the RCC configured to:
receive, by way of the remote crane controls, a remote control command configured to cause a given operation by the remote controlled crane system;
determine, in response to receiving the remote control command, whether the remote controlled crane activation system is activated; and
in response to determining that the remote controlled crane activation system is activated:
send, to the remote controlled crane system by way of the communication network, crane remote control data comprising a command configured to cause the given operation by the remote controlled crane system.

2. The system of claim 1, wherein the RCCC is further configured to:
in response to determining that the remote controlled crane activation system is not activated, inhibit sending of the command to the remote controlled crane system.

3. The system of claim 1, wherein the remote crane control activation system is activated in response to employment of an access control device.

4. The system of claim 3, wherein the access control device comprises a radio frequency identification (RFID) token, wherein the remote crane control activation system comprises a RFID reader, and wherein the remote crane control activation system is activated in response to the RFID reader reading information from the RFID token.

5. The system of claim 1, wherein the remote crane control activation system comprises a redundant access control system comprising an access control device, and wherein the remote crane control activation system is activated in response to (a) employment of the access control device to enable activation of the remote crane control activation system by way of a remote state control; and (b) activation of the remote state control.

6. The system of claim 1, wherein the RCC is further configured to:
set a remote control status bit to a first state in response to the remote crane control activation system being activated; and
set the remote control status bit to a second state in response to the remote crane control activation system being deactivated,
wherein determining whether the remote controlled crane activation system is activated comprises polling the remote control status bit to determine whether the remote control status bit is set to the first state, and wherein it is determined that the remote controlled crane activation system is activated in response to determining that the remote control status bit is set to the first state.

7. The system of claim 1, wherein the remote controlled crane system comprises a local remote crane control activation system configured to be (a) activated to enable remote control of the remote controlled crane system, and (b) deactivated to disable remote control of the remote controlled crane system, such that (i) when a remote control command is transmitted to the remote controlled crane system while the local remote crane control activation system is activated, the remote controlled crane system is configured to operate based on the remote control command, and (ii) when a remote control command is transmitted to the remote controlled crane system while the local remote crane control activation system is deactivated, the remote controlled crane system is configured to not operate based on the remote control command.

8. A remote crane system comprising:
a remote crane control center (RCCC) comprising:
a remote crane controller (RCC);
remote crane controls configured to be manipulated by a remote crane operator to control operation of a remote controlled crane system; and
a remote crane control activation system configured to be (a) activated to enable control of the remote controlled crane system by way of the remote crane controls, and (b) deactivated to disable control of the remote controlled crane system by way of the remote crane controls, wherein the remote crane control activation system comprises a remote state control configured to be (a) set to a first state configured to activate the remote crane control activation system and (b) set to a second state configured to deactivate the remote crane control activation system, wherein the remote state control comprises a switch,
the remote controlled crane system configured to be located at a jobsite, the remote controlled crane system comprising:
a lifting system configured to lift a load; local crane controls configured to be manipulated by a local crane operator to control operation of the remote controlled crane system;
a local activation system comprising a remote activation switch configured to selectively enable or disable remote control of the remote controlled crane system, wherein selectively enable or disable remote control of the remote controlled crane system comprises respectively activating or deactivating a channel of a network interface of the remote controlled crane system; and
a crane controller configured to:
receive, from the local crane controls, local control commands and operate the remote controlled crane system based on the local control commands; and
receive, from the RCCC by way of a communication network, remote control commands, and operate the remote controlled crane system based on the remote control commands; and
the RCC configured to:
receive, by way of the remote crane controls, a remote control command configured to cause a given operation by the remote controlled crane system;
determine, in response to receiving the remote control command, whether the remote controlled crane activation system is activated; and in response to determining that the remote controlled crane activation system is activated:
send, to the remote controlled crane system by way of the communication network, crane remote control data comprising a command configured to cause the given operation by the remote controlled crane system.

9. The system of claim 8, wherein the RCC is further configured to:
in response to determining that the remote controlled crane activation system is not activated, inhibit sending of the command to the remote controlled crane system.

10. The system of claim 8, wherein the remote crane control activation system is activated in response to employment of an access control device.

11. The system of claim 10, wherein the access control device comprises a radio frequency identification (RFID) token, wherein the remote crane control activation system comprises a RFID reader, and wherein the remote crane control activation system is activated in response to the RFID reader reading information from the RFID token.

12. The system of claim 8, wherein the remote crane control activation system comprises a redundant access control system comprising an access control device, and wherein the remote crane control activation system is activated in response to (a) employment of the access control device to enable activation of the remote crane control activation system by way of a remote state control; and (b) activation of the remote state control.

13. The system of claim 8, wherein the RCCC is further configured to:
set a remote control status bit to a first state in response to the remote crane control activation system being activated; and
set the remote control status bit to a second state in response to the remote crane control activation system being deactivated,
wherein determining whether the remote controlled crane activation system is activated comprises polling the remote control status bit to determine whether the remote control status bit is set to the first state, and wherein it is determined that the remote controlled crane activation system is activated in response to determining that the remote control status bit is set to the first state.

14. The system of claim 8, wherein the remote controlled crane system comprises a local remote crane control activation system configured to be (a) activated to enable remote control of the remote controlled crane system, and (b) deactivated to disable remote control of the remote controlled crane system, such that (i) when a remote control command is transmitted to the remote controlled crane system while the local remote crane control activation system is activated, the remote controlled crane system is configured to operate based on the remote control command, and (ii) when a remote control command is transmitted to the remote controlled crane system while the local remote crane control activation system is deactivated, the remote controlled crane system is configured to not operate based on the remote control command.

15. A method of operating a remote control crane system, the method comprising:
receiving, by a remote crane controller (RCC) by way of remote crane controls of a remote crane control center (RCCC), a remote control command configured to cause a given operation by a remote controlled crane system,
the remote crane control center (RCCC) comprising:
the remote crane controller (RCC);
remote crane controls configured to be manipulated by a remote crane operator to control operation of a remote controlled crane system; and
a remote crane control activation system configured to be (a) activated to enable control of the remote controlled crane system by way of the remote crane controls, and (b) deactivated to disable control of the remote controlled crane system by way of the remote crane controls, wherein the remote crane control activation system comprises a remote state control configured to be (a) set to a first state configured to activate the remote crane control activation system and (b) set to a second state configured to deactivate the remote crane control activation system, wherein the remote state control comprises a switch,
the remote controlled crane system configured to be located at a jobsite, the remote controlled crane system comprising:
a lifting system configured to lift a load;
local crane controls configured to be manipulated by a local crane operator to control operation of the remote controlled crane system;
a local activation system comprising a remote activation switch configured to selectively enable or disable remote control of the remote controlled crane system, wherein selectively enable or disable remote control of the remote controlled crane system comprises respectively activating or deactivating a channel of a network interface of the remote controlled crane system; and
a crane controller configured to:
receive, from the local crane controls, local control commands and operate the remote controlled crane system based on the local control commands; and
receive, from the RCCC by way of a communication network, remote control commands, and operate the remote controlled crane system based on the remote control commands;
determining, by the RCC in response to receiving the remote control command, that the remote controlled crane activation system is activated; and
sending, by the RCC to the remote controlled crane system by way of the communication network in response to determining that the remote controlled crane activation system is activated, crane remote control data comprising a command configured to cause the given operation by the remote controlled crane system.

16. The method of claim 15, wherein the remote crane control activation system comprises a remote state control configured to be (a) set to a first state to activate the remote crane control activation system and (b) set to a second state to deactivate the remote crane control activation system, and wherein determining that the remote controlled crane activation system is activated comprises determining that the remote state control is set to the first state to activate the remote crane control activation system.

* * * * *